United States Patent [19]
Sutherland

[11] Patent Number: 5,214,745
[45] Date of Patent: May 25, 1993

[54] ARTIFICIAL NEURAL DEVICE UTILIZING PHASE ORIENTATION IN THE COMPLEX NUMBER DOMAIN TO ENCODE AND DECODE STIMULUS RESPONSE PATTERNS

[76] Inventor: John G. Sutherland, 233 Herkimer Street, Hamilton, Ontario, Canada, L8P 2H8

[21] Appl. No.: 343,490

[22] Filed: Apr. 26, 1989

Related U.S. Application Data

[63] Continuation-in-part of Ser. No. 236,445, Aug. 25, 1988, abandoned.

[51] Int. Cl.$^5$ ............................................. G09C 15/00
[52] U.S. Cl. ...................................... 395/22; 395/23; 395/24
[58] Field of Search ................. 381/41, 42, 43, 49, 381/50; 382/10, 15, 30, 31, 33-35; 364/513, 513.5, 807, 602, 200 MS file, 900 MS File, 726; 365/125, 216, 49; 350/316; 395/11, 20, 21, 22, 23, 24

[56] References Cited

U.S. PATENT DOCUMENTS

| | | | |
|---|---|---|---|
| 4,701,879 | 10/1987 | Scarr | 365/49 |
| 4,739,496 | 4/1988 | Marom et al. | 350/3.6 |
| 4,837,843 | 6/1989 | Owechko | 382/31 |
| 4,862,406 | 8/1989 | Fisher | 364/822 |
| 4,918,618 | 4/1990 | Tomlinson, Jr. | 364/807 |

*Primary Examiner*—Jerry Smith
*Assistant Examiner*—Jim Trammel
*Attorney, Agent, or Firm*—James W. Kerr

[57] ABSTRACT

An artificial neural device comprising; a data storage and processing device for encoding data in an abstract form representative of stimulus-response patterns onto said data storage device whereby multiple stimulus-response patterns are superimposed onto said data storage device by said processing device; a device for decoding a previously encoded response associated with a stimulus when said data storage and processing device is stimulated by said stimulus.

5 Claims, 16 Drawing Sheets

Configuration for a Single Processing Node

Figure 1

Average Error Within Generated Response vs
Ratio of Patterns Encoded (P) to Number of Synaptic Inputs (N)

| P/N ratio | Averge Analog Error in Generated Response (% full scale) |
|---|---|
| 0.05 | 2.5 |
| 0.1 | 3.4 |
| 0.15 | 4.2 |
| 0.2 | 4.7 |
| 025 | 5.2 |
| 0.3 | 5.6 |
| 0.35 | 6.0 |
| 0.4 | 6.3 |
| 0.45 | 6.6 |
| 0.5 | 6.9 |

Figure 2A     Schematic Diagram of a Neuron
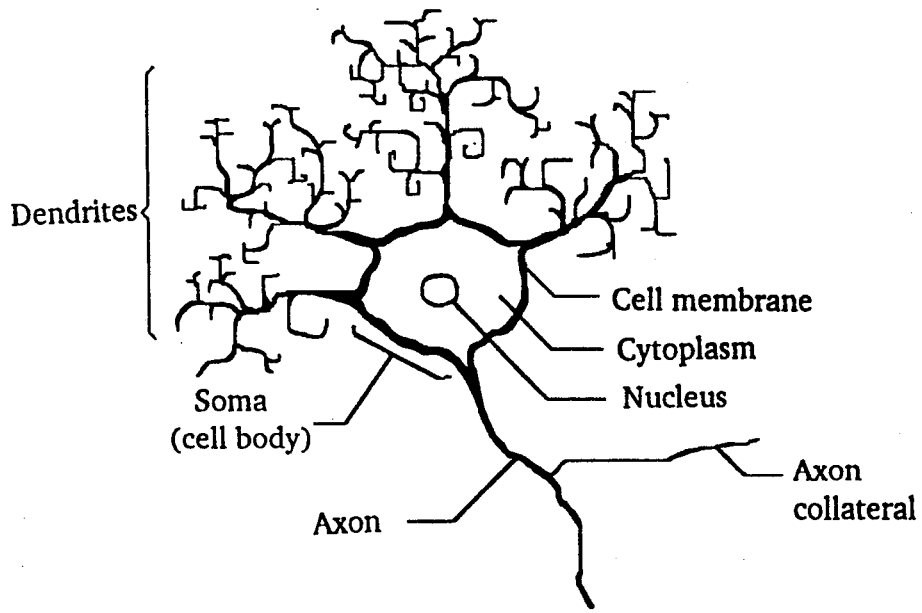
Figure 2B     Diagram of Synapses and Information Flow in the Cortex
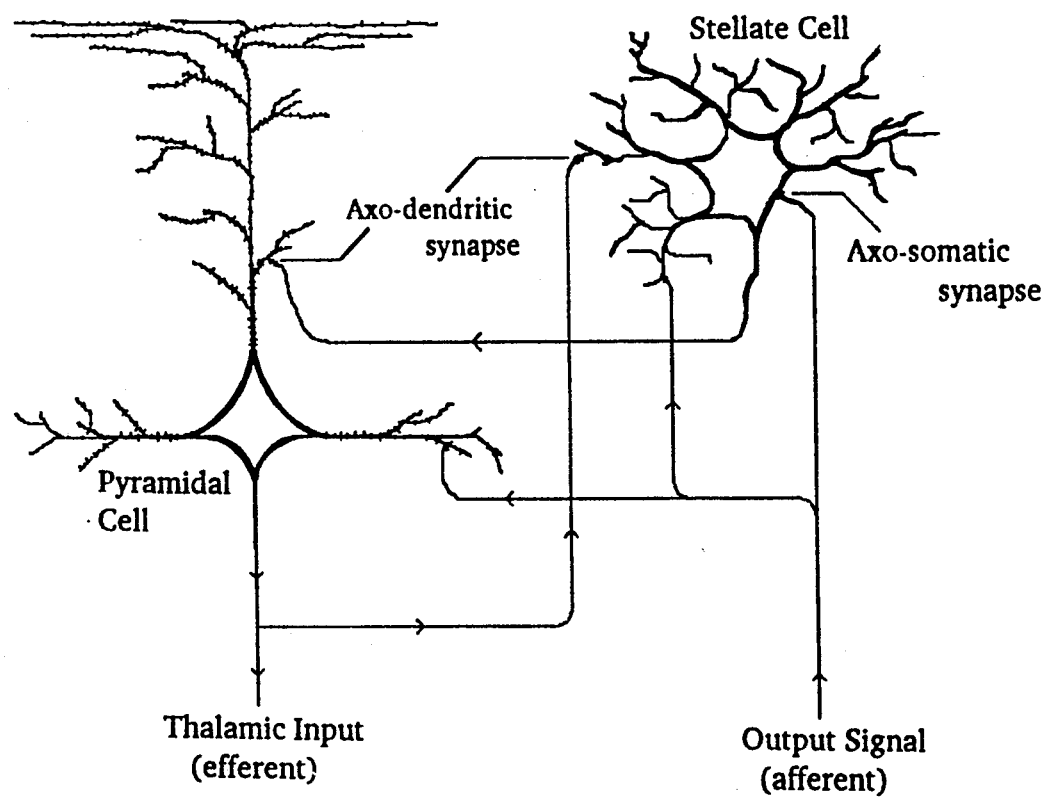

Figure 3A  Signal Transmission Characteristics of the Neuron Cell
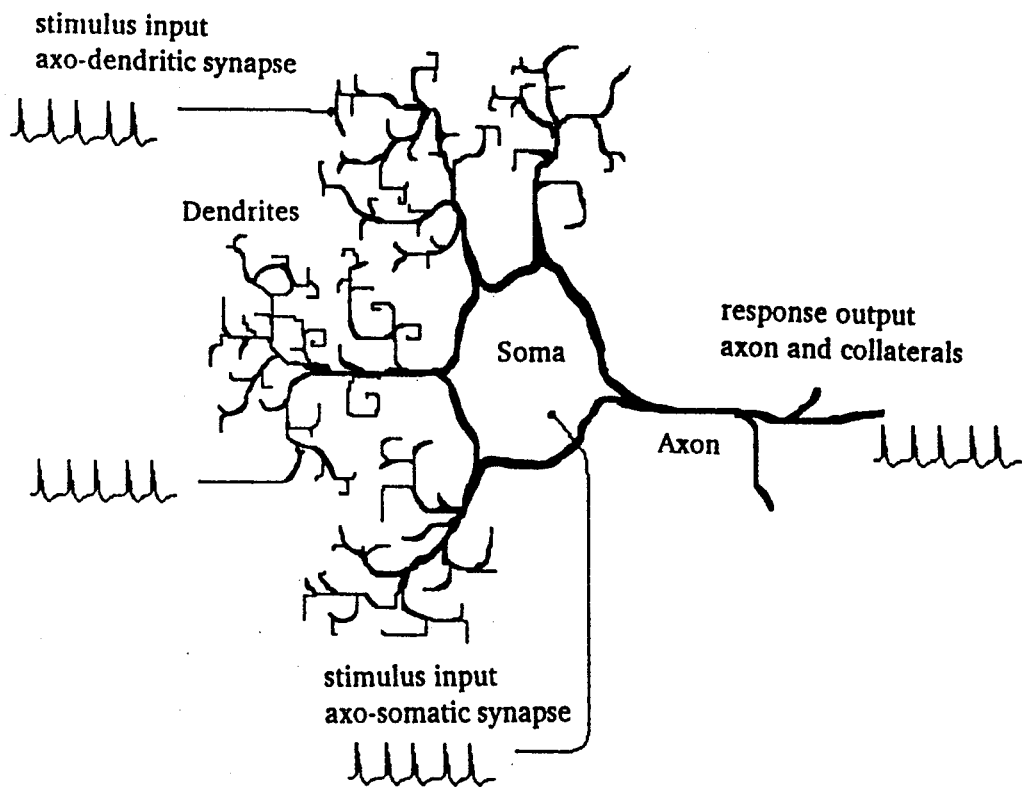
Figure 3B  Sigmoidal Response Characteristic of a Neuron Cell
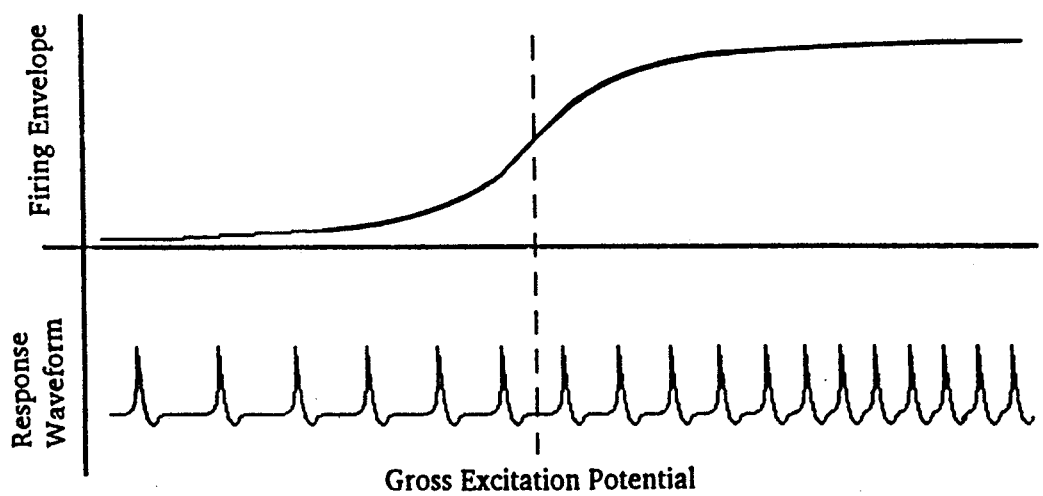

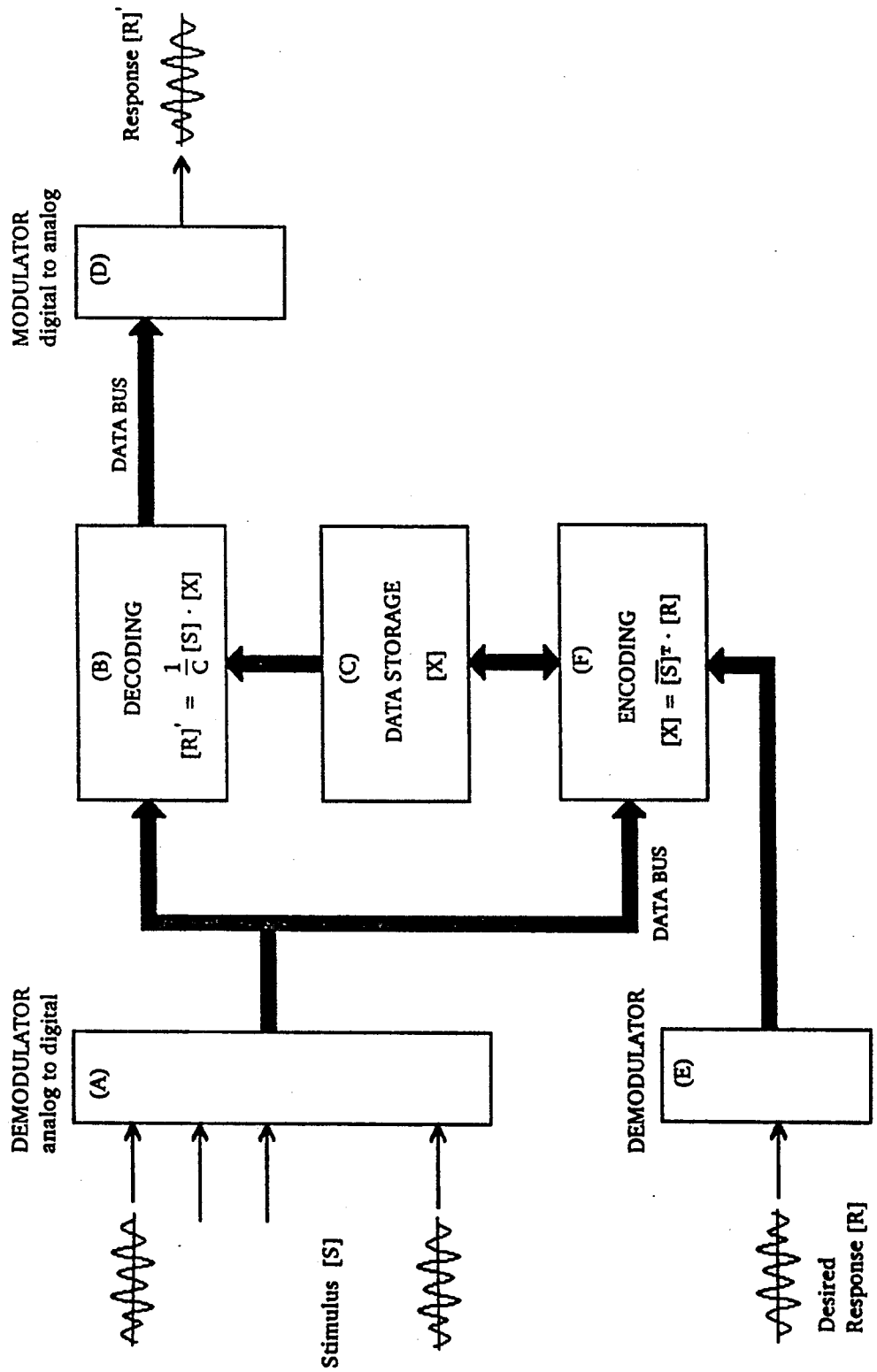
Figure 4 A Possible Hardware Configuration for One Neural Element

A Possible Hardware Configuration for a Visual to Auditory ANS Device

Illustration of a Digitized Visual Image 16 by 16 pixels 32 by 32 pixels 64 by 64 pixels

Figure 7 - Example of a List of Phoneme Codes

| Code (base 6) | Sound (capitalized in sample word) | |
|---|---|---|
| 00 | A | mAke |
| 01 | AE | bAt |
| 02 | AH | cAr |
| 04 | AW | dOg |
| 05 | B | Bat |
| 10 | CH | CHeese |
| 11 | EE | bE |
| 12 | EH | bEt |
| 13 | F | raFt |
| 14 | G | Go |
| 15 | H | Hive |
| 20 | I | Time |
| 21 | IH | sIt |
| 22 | J | Jet |
| 23 | K | Kiln |
| 24 | L | Listen |
| 25 | M | Map |
| 30 | N | Nap |
| 31 | OH | gO |
| 32 | OO | fOOl |
| 33 | P | Pat |
| 34 | R | Rat |
| 35 | S | Sat |
| 40 | SH | SHe |
| 41 | T | Tap |
| 42 | TH | THin |
| 43 | TZ | THis |
| 44 | U | wOrd |
| 45 | UH | bUt |
| 50 | V | Vat |
| 51 | W | With |
| 52 | WH | WHich |
| 53 | Y | Yes |
| 54 | Z | Zap |
| 55 | ZH | viSion |

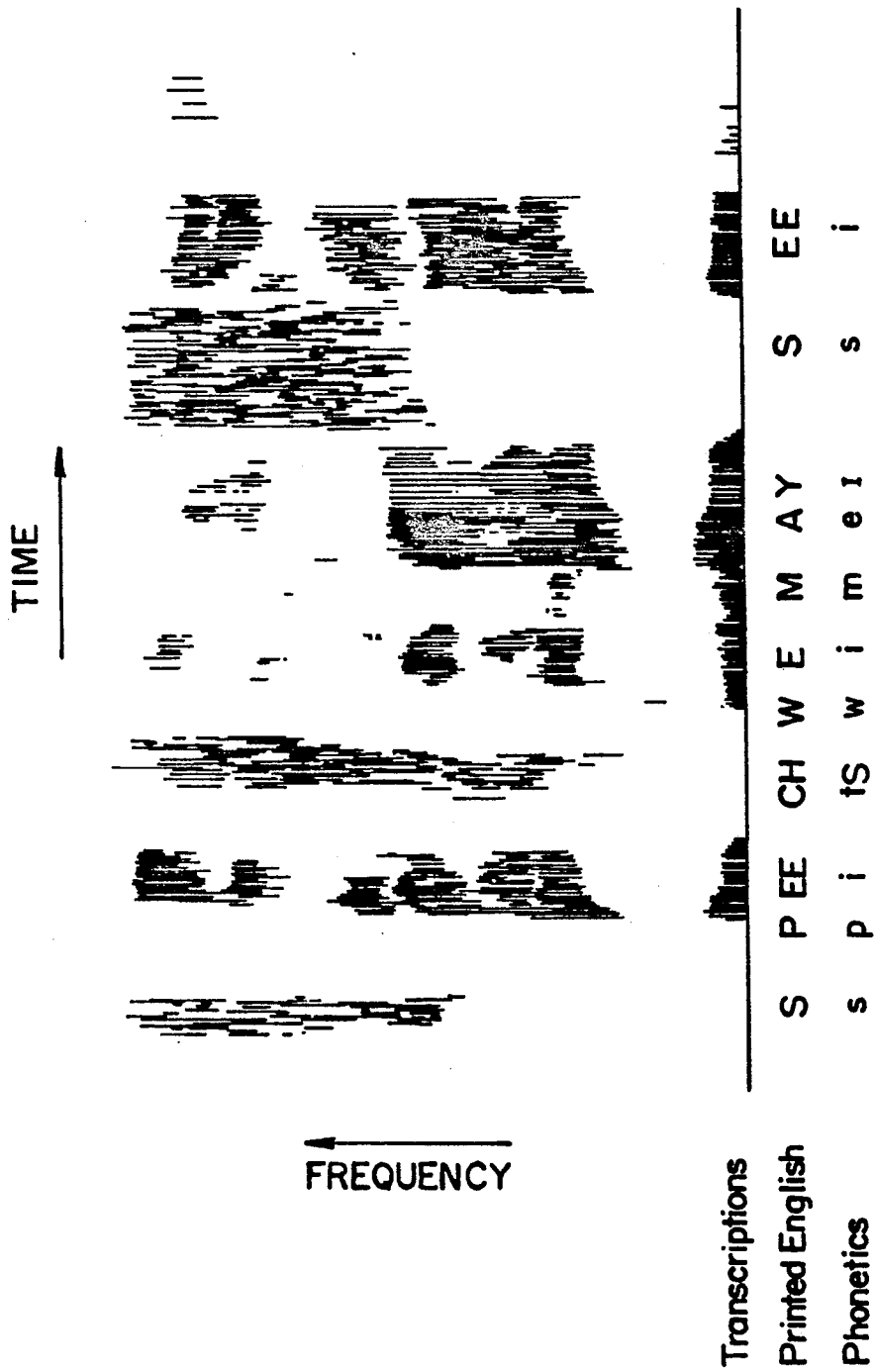
Fig. 8 Illustration of a Sonogram for Auditory Input

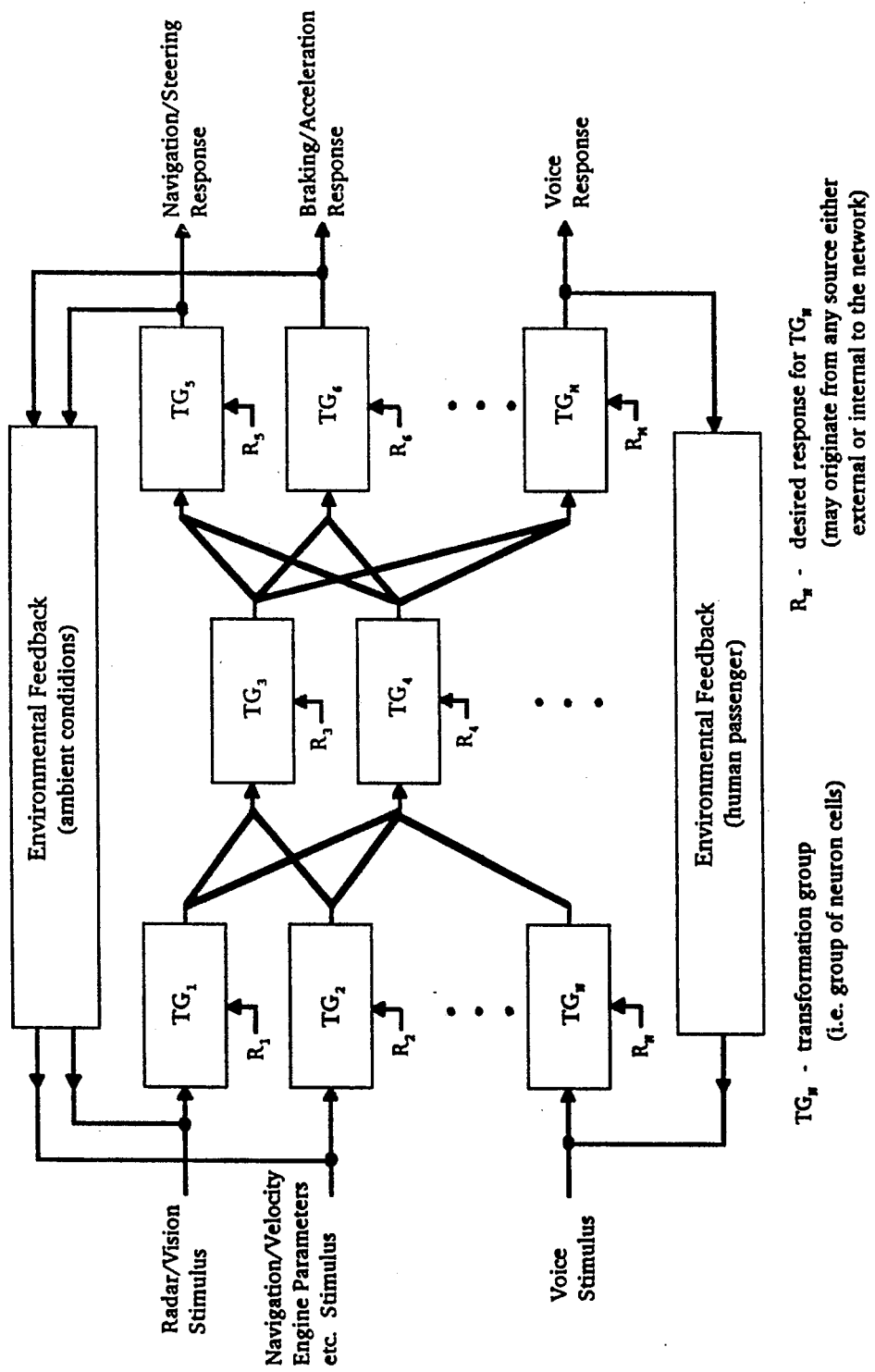
Figure 9 Illustration of a Multilayered Feedback Configuration For a Transportation Application

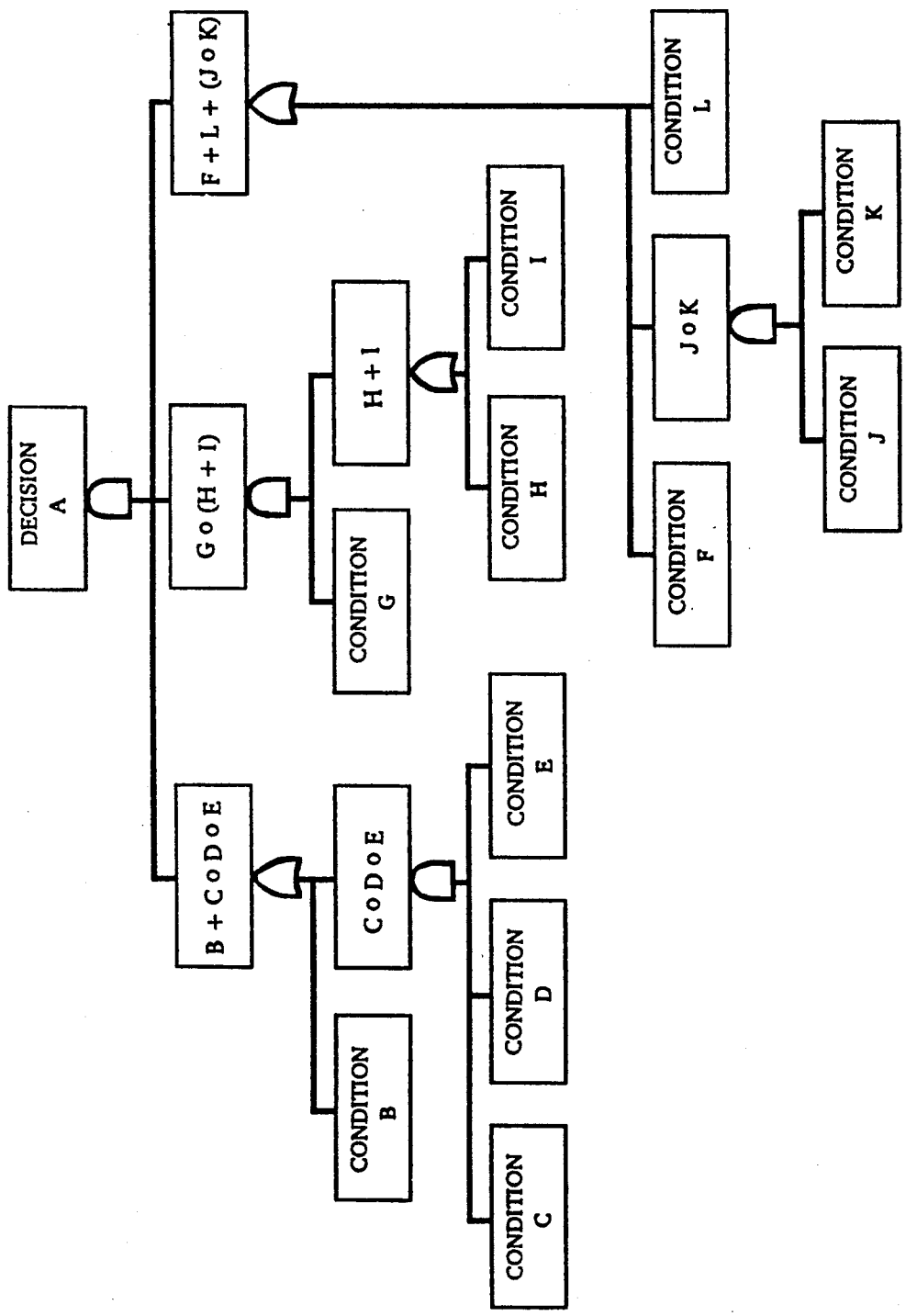
Figure 11 Simple Decision Tree Structure

Figure 12 Illustration of a Layered Network
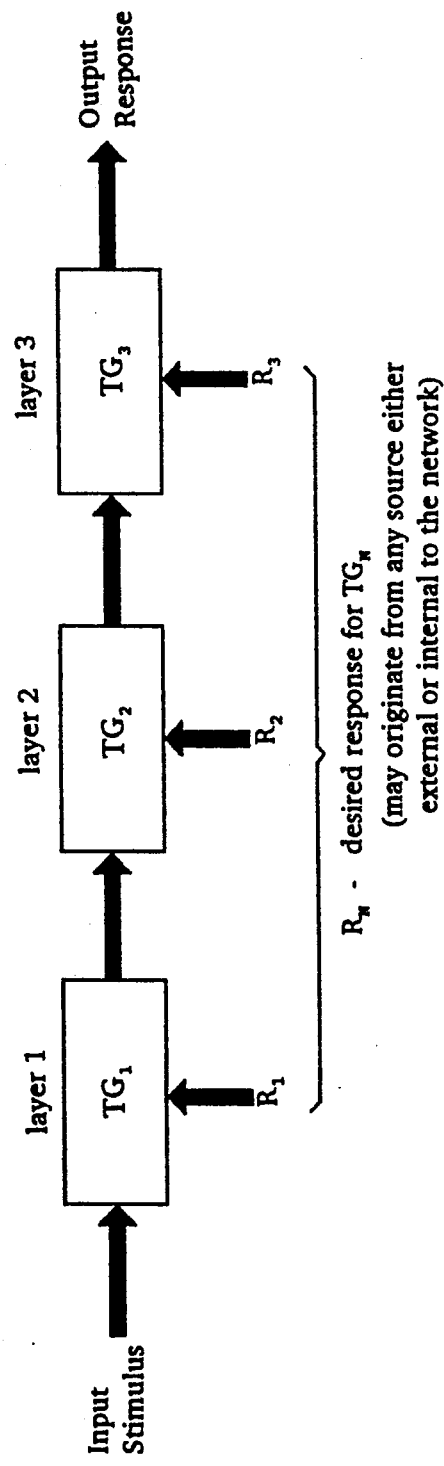

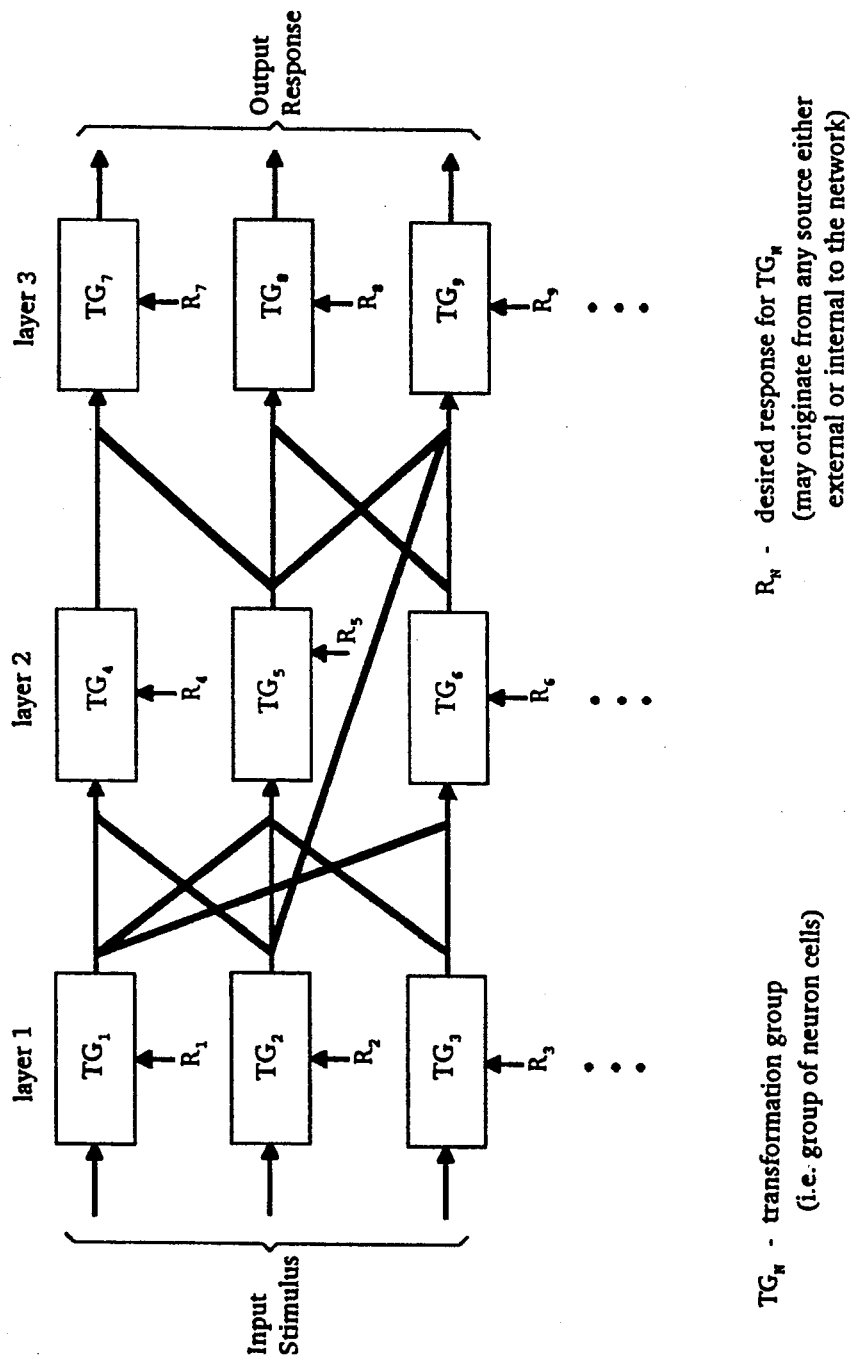
Figure 13 Illustration of a Layered Parallel Network

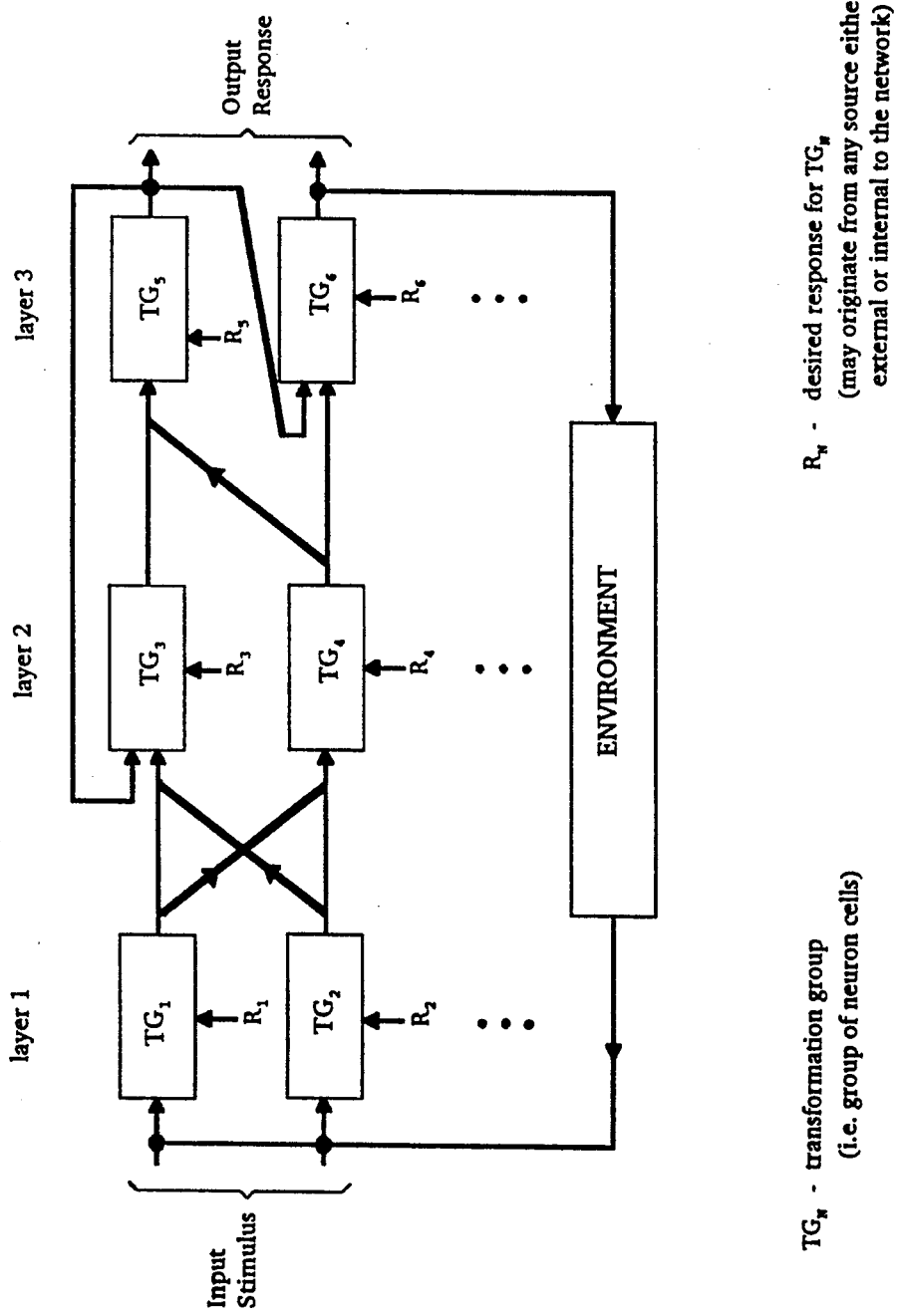
Figure 14 Illustration of a feedback Network

Figure 15 Configuration for a Single Processing Node
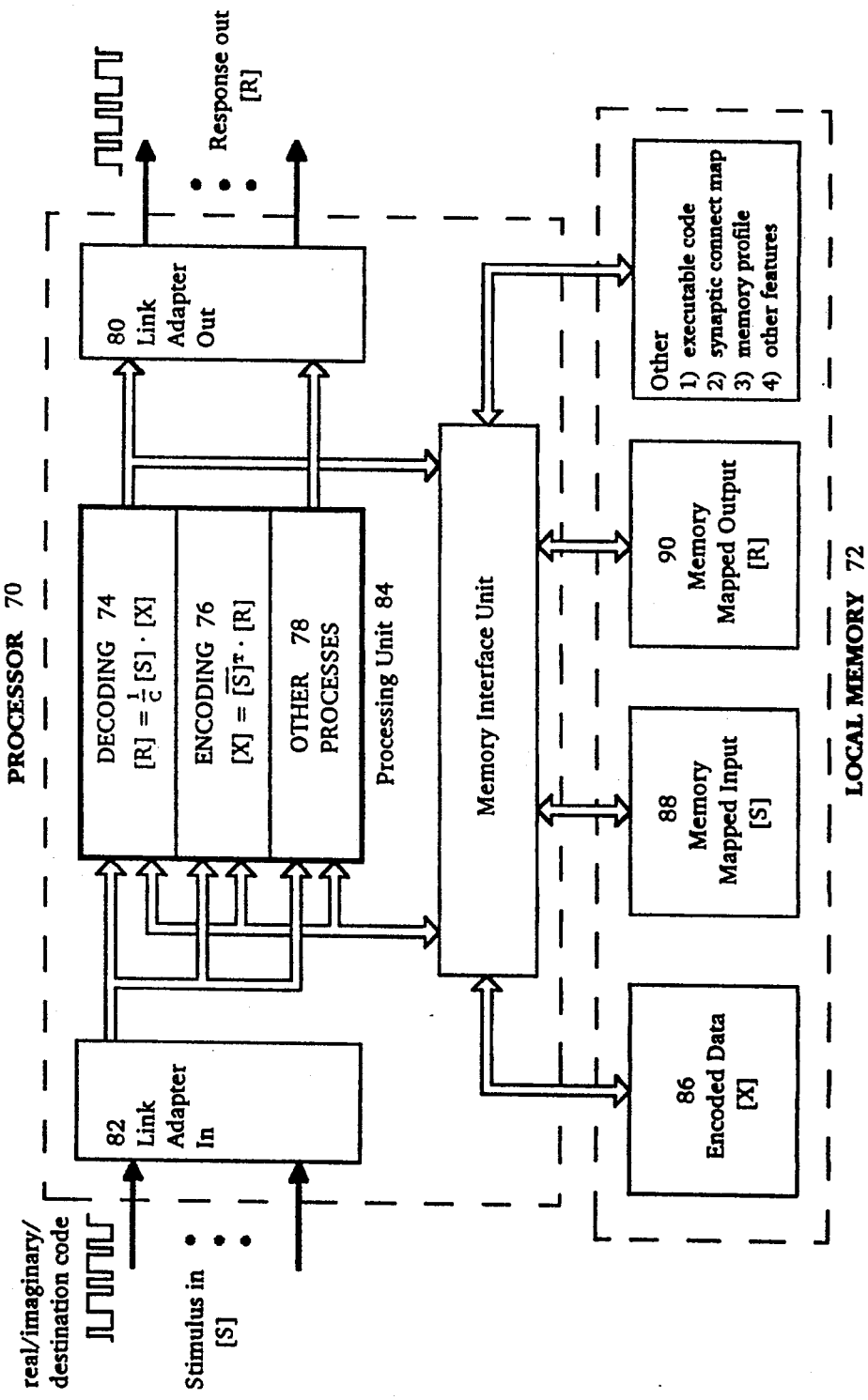

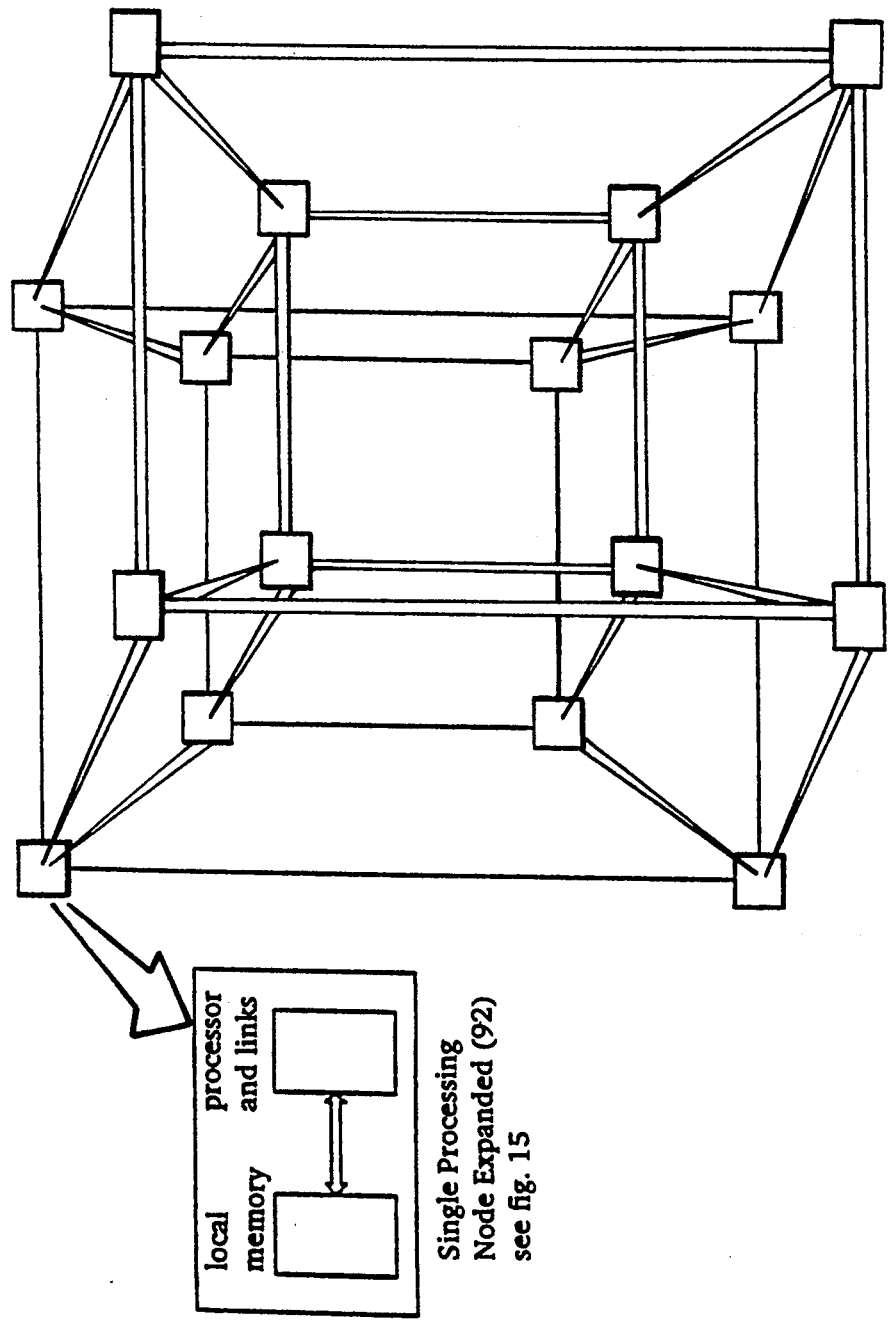
Figure 16  Example of Link Communication Between Processing Nodes (16 node hypercube)

5,214,745

ARTIFICIAL NEURAL DEVICE UTILIZING PHASE ORIENTATION IN THE COMPLEX NUMBER DOMAIN TO ENCODE AND DECODE STIMULUS RESPONSE PATTERNS

BACKGROUND OF THE INVENTION

This application is a continuation in part of applicant's application filed Aug. 25, 1988 for an invention entitled "Artificial Neural Device" bearing serial number 07/236,445 abandoned.

This invention relates to artificial neural devices and in particular relates to artificial neural devices having enhanced storage and processing capabilities.

Artificial neural systems embody a form of artificial intelligence which attempts to emulate the way in which biological neurons or group of neurons process information. Artificial neural systems (ANS) may be embodied in computational hardware and/or software which are capable of processing and storing information.

ANS devices can store a relatively large number of patterns, so as to quickly produce a particular response when the ANS device is stimulated by a particular stimulus input. In contrast to conventional computer hardware/software systems employing Von Newman architecture and structured programming methods, ANS devices immediately map input patterns into the nearest stored pattern.

Currently ANS devices fall into two general categories namely:
(a) unidirectional models whereby stimulus response patterns are stored for each stimulus and the ANS device propagates information processing through the network in one direction,
(b) bidirectional models whereby the ANS device processes information in a bidirectional manner and converges to a particular response pattern in response to stimulus input.

Each of said prior art models exhibit limited capability due do the need of numerous processing stages or iterations required to produce the desired stimulus-response action as well as the limited information storage capacity.

Furthermore said prior ANS devices are relatively complicated to construct and produce relatively meager results when used in pattern recognition systems or devices.

It is an object of this invention to produce improved artificial neural systems and devices which exhibit improved capabilities over the prior state of the art.

The device described herein employs a novel method of storing and processing information. The advantages and operational characteristics realized by the invention described herein are outlined below:
i) The ANS device permits multiple stimulus-response patterns to be superimposed upon the same storage medium thus creating information storage densities far greater than current and conventional data storage devices or methods permit.
ii) The ANS device facilitates decoding a response associated with a given stimulus when said ANS device is stimulated by said stimulus. The advantage is realized in that the response is issued in one non-iterative pass. Secondly, resulting from the method by which information is superimposed upon the same storage medium, a decoding transformation as performed upon any one storage element, transforms all information represented in an abstract form by said storage element. The rate of processing is therefore greatly increased over existing artificial neural systems.
iii) The said ANS device is general in form and may be applied in a generic fashion to accommodate encoding and decoding of substantially any form of stimulus-response patterns. For example the stimulus-response patterns may represent sensory modality, physical parameter or abstract representation of the above. The ANS device is encoded in a generic fashion by exposing said ANS device to a set or multiple set of stimulus-response patterns. Similarly decoding is facilitated in a generic fashion by exposing said ANS device to a stimulus similar to a stimulus associated with an encoded stimulus-response pattern and said ANS device responds by generating said associated response output.
iv) Said stimulus-response patterns are not limited to binary values and are not limited to any number base system representation on conversion scale (i.e. logarithmic). Said ANS device permits encoding and decoding of said stimulus-response patterns whose elements are continuously variable within any defined range of values.
v) Said ANS device may be modified to accommodate encoding and decoding of any large number of sets of said stimulus-response patterns as associated with any given size of stimulus field. The size of said stimulus field is defined as the number of elements (elements of information) within said stimulus field. The increase in storage capacity within said ANS device is performed at the expense of increased number of data storage devices required.
vi) Said response output referred to in subparagraph iii) above contains a deterministic error of variable magnitude. Said deterministic error characterizes a fuzziness factor or contribution within the response output. The probabilistic variance of said deterministic error within response output is proportional to the number of stimulus-response patterns encoded into the ANS device. The deterministic error within the response output is sufficiently small in magnitude to permit multiple sets of the stimulus-response patterns to be encoded or superimposed onto said ANS device.
vii) Efficiency of said ANS device is represented by the ratio of number of data storage elements within said ANS device over the number of elements of information that may be stored in abstract form within said ANS device. The efficiency characteristics of said ANS device are such that the efficiency is proportional to the number of elements (element of information) within said stimulus field.
viii) Operational characteristics of said ANS device resembles in a general fashion the operational characteristics of the neurobiological system with respect to information processing. Said ANS device stores information in fashion analogous to the established Hebb hypothesis. The Hebb hypothesis defines the generally accepted information storage mechanism of the biological neuron. Individual processing elements within the ANS device process the input stimulus in a sigmoid functional relationship as does the biological neuron. The ANS device processes information in the form of stimulus-response relationships as does the neurobiological system. The ANS device encodes or learns stimulus-response relationships by exposure to the stimulus-response patterns as does the neurobiological system. The ANS device issues immediate output response (non-iterative mechanism) upon stimulation by input stimulus as does the neurobiological system. The ANS device inherently exhibits the characteristics of fuzzy memory or fuzzy logic as does the neurobiological system. The ANS device has the capacity to store, recognize, and issue an encoded or learned response to vast sets of stimulus patterns as does the neurobiological system.

The broadest aspect of this invention relates to an artificial neural device comprising; a unit for storing and processing data in an abstract form representative of stimulus-response patterns; a device for encoding data onto said data storage and processing unit by translating the elements of associated stimulus and response patterns into complex numbers or vectors with the associated information represented by a vector phase angle or vector orientation and a magnitude component, and generating a matrix whose elements are complex numbers or vectors encoding said multiple stimulus-response patterns, whereby each said stimulus-response pattern is superimposed onto said storage unit; said unit decoding a response associated with an encoded stimulus-response pattern when said matrix encoded in said data storage unit is stimulated by said stimulus signal.

Another aspect of this invention is a method of enhancing the storage and computing capacity of artificial neural devices comprising the steps of: encoding data by translating sets of associated stimulus and response signals into complex numbers represented by a vector phase angle and magnitude; generating a matrix representing stimulus response patterns for each set of associated stimulus response signals whereby each said stimulus response is superimposed onto data storage and processing unit; decoding a response signal associated with a stimulus signal by applying said stimulus signal to said stimulus response patterns encoded in said data storage unit so as to generate said response signal associated with said stimulus signal.

Another aspect of this invention relates to a pattern recognition device for generating a response signal in response to a stimulus signal comprising: a device for reading or inputting a stimulus signal; a device for translating elements of said stimulus signal into complex numbers or vectors with the associated information represented by vector phase angle or vector orientation and a magnitude component; a unit for storing said translated stimulus signals; a device for translating elements of said response signal into complex numbers or vectors with the associated information represented by vector phase angles or vector orientations and a magnitude component; a unit for storing said translated response signals; a device for generating and storing a matrix representing stimulus-response patterns for each set of translated, associated stimulus and response signals thereby superimposing each stimulus-response pattern onto the said storage unit; a device for generating a response signal when said unit for storing said matrix and performing decoding transformations is stimulated by said stimulus signal associated with said response signal.

Another aspect of this invention is a method of enhancing pattern recognition in an artificial neural device comprising the steps of: producing a stimulus signal; translating said stimulus signal by a processing unit into complex numbers represented by vector phase angle and magnitude; storing said translated stimulus signal into a storage units generating a response signal associated with a stimulus signal by said processing unit into complex numbers represented by vector phase angle and magnitude; translating said response signals by said processing unit and storing said translated response signals onto said storage unit; generating a matrix representing stimulus response patterns for each set of associated stimulus and response signals and storing each said stimulus response patterns onto said storage unit; generating a response signal when said matrix of stimulus response patterns is stimulated by said stimulus signal associated with said response signal.

Another aspect of this invention relates to a vision recognition device for generating an auditory response signal in response to a visual stimulus signal comprising: visual field input device or camera for generating a stimulus signal when operably activated; a storage unit for storing data; a unit for translating elements of said visual stimulus signal into complex numbers with the associated information represented by vector phase angles and magnitude components and storing said translated visual stimulus signals onto said storage unit; device for reading or imputing an auditory response signal associated with a visual stimulus signal; unit for translating said auditory response signals into complex numbers or vectors with the associated information represented by vector phase angles and magnitude components and storing said translated character word response signals onto said storage unit; a processing device capable of performing transformations to generate a matrix representing a stimulus-response patterns for each set of associated visual stimulus and auditory response signals and superimposing each said stimulus-response patterns onto said storage unit; a processing device capable of performing transformations to generate a response signal when said processing device accessing matrix of encoded stimulus-response patterns is stimulated by said visual stimulus signal associated with said auditory response signal; a device for transforming said response signal represented by complex numbers or vectors into auditory output.

Yet another aspect of this invention is method of generating an auditory response by an artificial neural device in response to a visual stimulus signal comprising the steps of: producing a visual stimulus signal through a video camera unit then; translating said visual stimulus signal into complex numbers represented by vector phase angle and magnitude and storing said translated visual stimulus signal onto a storage unit; a device for generating an auditory response signal associated with said visual stimulus signal; a unit for translating said auditory response signal into complex numbers represented by vector phase angle and magnitude and storing said translated auditory response signal onto said storage unit; a device for generating and storing a matrix representing stimulus response patterns for each set of associated visual stimulus signals and auditory response signals and storing said stimulus response patterns onto said storage unit; generating an auditory response when said matrix of stimulus response patterns is stimulated by said visual stimulus signal associated with said auditory response signal.

Another aspect of this invention relates to a speech recognition device for generating an output signal encoding character words or Roman numerals in response to a spoken auditory stimulus signal comprising: an auditory input or microphone device for generating a auditory stimulus signal when operably activated; a storage unit for storing data; a unit for translating elements of said auditory stimulus signal into complex numbers with the associated information represented by vector phase angles and magnitude components and storing said translated visual stimulus signals onto said storage unit; a device for reading or imputing a character word response signal associated with an auditory stimulus signal; a unit for translating said character word response signals into complex numbers or vectors with the associated information represented by vector phase angles and magnitude components and storing said translated character word response signals onto said storage unit; a processing device capable of performing transformations to generate a matrix representing stimulus-response patterns for each set of associated auditory stimulus and character word response signals and superimposing each said stimulus-response patterns onto said storage unit; a processing device capable of performing transformations to generate a response signal when said processing device accessing matrix of encoded stimulus-response patterns is stimulated by said visual stimulus signal associated with said auditory response signal; a device for transforming said response signal represented by complex numbers or vectors into the character word representation.

Yet another aspect of this invention relates to a robotic device for generating an output signal encoding axial position or axial rates of movement in response to stimulus signals encoding axial positions, axial rates of movements, visual input data, tactile information, etc., the system comprising: a position sensing device for generating position and rate of movement stimulus signals; a visual field input device for generating a visual stimulus signal; a pressure sensor device or devices for generating tactile stimulus signals; storage unit for storing data; a unit for translating elements of said axial position, axial rate of movement, visual, and tactile stimulus signals into complex numbers with the associated information represented by vector phase angles and magnitude components and storing said translated stimulus signals onto said storage unit; a device for reading or imputing a robotic axial position or axial rate of movement response signal associated with said (robotic) axial position, axial rate of movement, visual and tactile stimulus signals; a unit for translating said robotic response signals into complex numbers or vectors with the associated information represented by vector phase angles and magnitude components and storing said translated robotic response signals onto said storage unit; a processing device capable of performing transformations to generate one or several matrices representing stimulus-response patterns for each set o associated robotic stimulus and robotic response signals and superimposing each said robotic stimulus-response patterns onto said storage unit; a processing device capable of performing transformations to generate a robotic response signal when said processing device accessing one or several matrices of encoded robotic stimulus-response patterns is stimulated by said robotic stimulus signal associated with said robotic response signals a device for transforming said robotic response signal represented by complex numbers or vectors into actual robotic axial movements or rates of movements.

Yet another aspect of their invention relates to an expert system or automated reasoning device for generating a decision or seemingly intelligent or otherwise intelligent output in response to a stimulus signals which may represent several diverse and distinct forms of sensory modalities, measured parameters, concrete or abstract concepts etc. The said output response may be embodied in any form of sensory modality (i.e. visual, auditory) however the output mode of speech shall be used for this example. The said expert system or automated reasoning device would comprise: a set of devices for reading or imputing said diverse and distinct forms of sensory modalities, measured parameters, concrete or abstract concepts for generation of the stimulus signal; a storage unit for storing data; a unit for translating elements of said multiple origin stimulus signals into complex numbers with the associated information represented by vector phase angles and magnitude components and storing said translated visual stimulus signals onto said storage unit; a device for reading or imputing an auditory response signal associated with a multiple origin stimulus signal; a unit for translating said auditory response signals into complex numbers or vectors with the associated information represented by vector phase angles and magnitude components and storing said translated character word response signals onto said storage unit; a processing device capable of performing transformations to generate one or several matrices representing stimulus-response patterns for each set of associated multiple origin stimulus and auditory response signals and superimposing each said stimulus-response patterns onto said storage unit; a processing device capable of performing transformations to generate a response signal when said processing device accessing matrices encoded stimulus- response patterns is stimulated by said multiple origin stimulus signal associated with said auditory response signal; a device for transforming said response signal represented by complex numbers or vectors into the auditory output. Said device would optimally consist of several layers of transformation groups and signal feedback mechanisms Said transformation group consists of a subset of stimulus-response patterns encoded into a subset of matrices whereby the stimulus input to subset of matrices originate from transformation groups in higher layers; output response from subset of matrices is fed back directly or indirectly into transformation groups in lower layers. Said feedback mechanism may consist of auditory response fed into environment; said auditory response inducing a reaction within the environment; said reaction within the environment may be embodied in any form (i.e. sound wave propagation, reaction of external device or organism, etc.); said reaction within the environment fed back into said expert system or automated reasoning device as a stimulus signal. Said feedback mechanism may consist of a second form whereby response outputs from said transformation groups in higher layers are fed back directly a stimulus inputs to said transformation groups in the same or lower layers.

It is also an aspect of this invention for enhancing the storage and capacity of the artificial neural device based on the process described herein employing any of the following methods:

(a) employing Hermittian preprocessing of the stimulus-response patterns prior to encoding said stimulus-response patterns onto the data and processing unit and prior to decoding a response from the data and processing unit.

(b) Combining groups of neural elements to form a system comprised of transformation groups wherein said transformation group encodes and decodes one or more elements within the response field associated with each input stimulus pattern. The transformation group may be configured into a single modular ANS device, electro-mechanically based, micro-electronic based, optically based, biologically based or otherwise.

(c) Combining groups of said transformation groups in a parallel arrangement such that input stimulus patterns are fed into several transformation groups and distinct responses are thus issued from each transformation group in accordance with that input stimulus pattern.

(d) Combining groups of said transformation groups into a layered arrangement such that the output response element of lower layers are fed into input the input stimulus field of higher layers.

(e) Combining groups of layered and parallel networks together in any configuration.

(f) Employing signal feedback mechanisms such that output response elements from transformation groups in higher layers is fed back, either directly or via the environment, to input stimulus fields of transformation groups in lower layers.

(i) Employing dynamic time variable decay of the encoded information representative of the synaptic connections and presented in an abstract form by said matrix [X]. The purpose of this technique is to establish a memory profile that determines the predominance of encoded information over any range extending from permanent or long term memory to very short term memory.

(j) Establishing an inhibitory excitory association for the synaptic connections.

It is also an aspect of this invention that the artificial neural system described herein may be applied for innumerable applications including:

(a) Incorporation of the artificial neural system into any system or subsystem whose function is to recognize or respond to visual input stimulus.

(b) Incorporation of the artificial neural system into any system or subsystem whose function is to recognize or respond to auditory input stimulus.

(c) Incorporation of the artificial neural system into any system or subsystem whose function is to recognize or respond to input stimulus that represents any form of sensory modality or abstract representation thereof.

(d) Incorporation of the artificial neural system into any system or subsystem whose function is to recognize or respond to input stimulus that represents any physical parameter or abstract representation thereof.

(e) Incorporation of the artificial neural system into any control system or control subsystem. This application encompasses but is not limited to any form of process control, mechanical control, electrical control, biological control, vehicular control, robotic control.

(f) Incorporation of the artificial neural system into any communication system or communication subsystem.

(g) Incorporation of the artificial neural system into any system that employs artificial intelligence concepts. This application encompasses but it not limited to expert systems and automated reasoning systems.

(h) Incorporation of the artificial neural process or device into any computational device to increase or enhance computational efficiency.

(i) Incorporation of the artificial neural system into any neurobiological or biological prosthesis device. This application encompasses but is not limited to artificial limbs, hearing aids, pacemakers.

ILLUSTRATIONS

These and other objects and features shall now be described in relation to the following drawings wherein:

FIG. 1 represents the probalistic standard deviation error within the response as a function of the number of encoded patterns.

FIGS. 2a and 2b illustrates in general the components of the biological neuron.

FIGS. 3a–3b illustrates in general the sigmoid response characteristics and signal processing characteristics of the biological neuron.

FIG. 4 illustrates an embodiment of hardware configuration for the artificial neural device illustrative of a single neural element.

Figure 5:
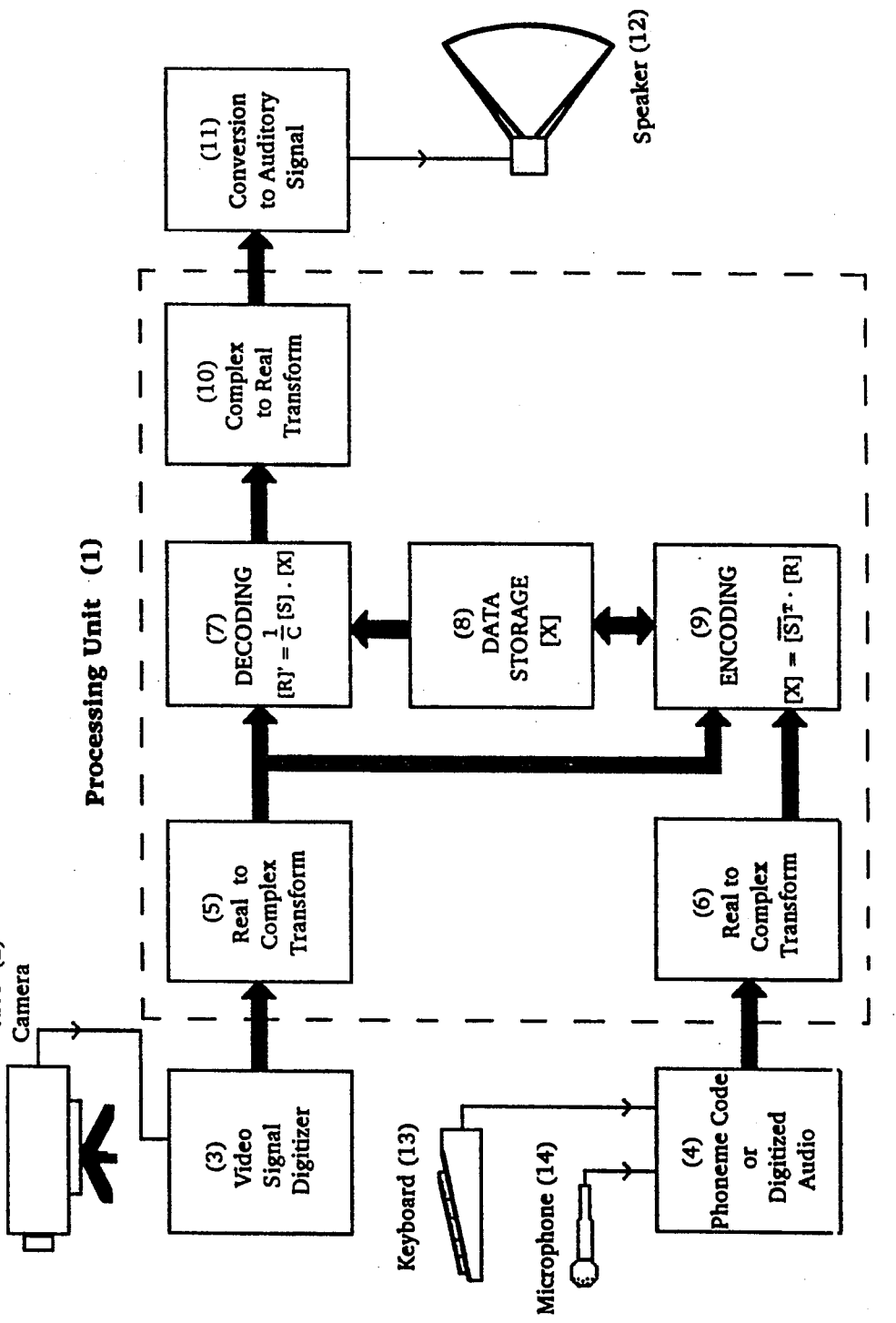
FIG. 5 illustrates in general an example of a hardware configuration for a visual to auditory artificial neural device.

FIG. 7 list of phoneme codes.

FIG. 8 illustrates a digitized sonogram for auditory input.

FIG. 9 illustrates the application of an artificial neural system within an automatically controlled transportation vehicle.

FIGS. 10a–10f illustrates patterns that correspond to incremental movements of a robotic system over a given time frame.

FIG. 11 illustrates a decision tree.

FIG. 12 illustrates a multilayered network.

FIG. 13 illustrates a layered parallel network.

FIG. 14 illustrates a feedback network.

FIG. 15 illustrates an embodiment of hardware configuration for the artificial neural device for a single processing node.

FIG. 16 illustrates an embodiment of a 16 node hypercube configuration for link communication between processing nodes.

DESCRIPTION OF INVENTION

Like parts will be given like member throughout the figures.

THEORY

A radically new approach to ANS theory is described herein. In order to effectively describe the invention herein a general conceptual description is provided followed by a mathematical description. A principle goal in the field of ANS research is the development of a mechanism to encode or superimpose a large amount of information onto a given data storage medium and facilitate a means to decode that stimulus input, via the encoded information, to produce a response output. An optical hologram provides a system roughly analogous to the above. The information encoding mechanism within the optical hologram permits a visual 3-dimensional object to be stored onto, and reconstructed from a 2-dimensional photographic plane effectively enfolding or collapsing an apparent dimension. As a result of the holographic encoding and decoding mechanisms, information storage densities within the 2-dimensional plane are greatly enhanced.

A similar analogy is presented for the ANS process described herein. The process however deals with information in the form of stimulus-response patterns and stores this information within an abstract mathematical domain. These stimulus-response patterns may represent any form of sensory modality and may be read-in either via external environmental receptors or (in the case for multineuronal systems) propagated through the system via analogous interneuronal synaptic connections. The process superimposes these stimulus-response patterns onto the same memory or storage medium. The theoretical basis is roughly analogous to the optical hologram, with a principal exception that the time index is the apparent dimension enfolded or collapsed.

On activation of the system by a stimulus pattern (decoding operation) the stimulus is processed via the accumulated information (all encoded stimulus-response patterns) to issue a near instantaneous response. The characteristics of the response output are described in the section pertaining to Decoding.

To provide a physical analogy, one may consider the seemingly effortless human task of recognizing a face. If complicated by several translations and rotations in space, this task is beyond the computational abilities of current methodologies employing present day computers. A system of the type described herein, however, can superimpose and store a very large set of images at various permutations of rotation and translation and, independent of the number of patterns stored, issue a desired response in a near instantaneous fashion. The principles outlined herein potentially present a basis for an explanation of our ability to store vast amounts of sensory information, and respond to familiar forms of sensory modalities at a near instantaneous fashion, and at a rate independent of the amount of information accumulated (i.e. respond at age 4 and age 40 with roughly the same rapidity).

The context of "patterns" as used within this application refers to sets of data and the term will be used to indicate same.

The data values contained within both the stimulus and the response patterns may represent any form or type of information. For example, the sets of data within the stimulus or response patterns may represent pixel values within a visual field, axis position or rates of movement within a robotic device, or Fourier transform elements for auditory input. Accordingly, both the stimulus and the response field may contain data representing any form of sensory modality, measurable parameter, or abstract representation of the above.

For purposes of illustration the stimulus signal or field will be represented by the following data set $[S]'$ and will be represented as a 1 by N matrix. For example matrix $[S]'$ may represent the numerical data produced by a video digitizing equipment when viewing an object such as an apple.

$$[S]' = [s_1, s_2, s_3, \ldots s_N] \qquad \text{eq. 1}$$

where $s_1$ to $s_N$ is a set of numeric or scalar values. Similarly the response field $[R]'$ associated with the stimulus input field will be represented by:

$$[R]' = [r_1, r_2, r_3, \ldots r_N] \qquad \text{eq. 2}$$

where $r_1$ to $r_M$ is a set of numeric values. For example such numerical values can represent a character representation of the word APPLE.

The process involves representing the information contained within both of the above sets, namely the stimulus signal or field $[S]'$ and response signal or field $[R]'$, as phase angles corresponding to vector orientation on a two dimensional or complex (Argand) plane. This may be performed by translating the above sets of data to the following vector matrices (1 by N, or M) whereby $s_N$ and $r_M$ values are normalized to, or scaled within a circular range corresponding to $2\pi$ or 360°, thus producing a proportional phase angle representation as denoted below by $\theta_N$ and $\Phi_N$ respectively:

$$[S] = [e^{i\theta 1}, e^{i\theta 2}, e^{i\theta 3}, \ldots e^{i\theta N}] \qquad \text{eq. 3}$$

$$[R] = [e^{i\Phi 1}, e^{i\Phi 2}, e^{i\Phi 3}, \ldots e^{i\Phi M}]$$

Several techniques may be employed to separate the above complex values into their real and imaginary components, the most common of which employs DeMoives theorem, i.e.:

$$e^{i\theta} = \cos\theta + i\sin\theta \qquad \text{eq. 4}$$

The above complex exponential function can be represented in several other forms (i.e. Z, 1 nZ, a+ib, etc.) however the exponential form has been used for convenience. Magnitude components may be associated with each element or vector within the stimulus $[S]$ and response $[R]$ field, however for simplification of this illustration, and the technique in general, the vector magnitudes are assumed equivalent to unity.

ENCODING

Encoding of the network is performed by determining the difference between the vector orientation or phase angle between every element (or subset of elements) in the stimulus input field $[S]$ and every element (or a subset of elements) in the output response field $[R]$. For the above pair of stimulus/response patterns $[S]$, $[R]$ the encoding function is given by the following vector matrix operation:

$$[M] = \overline{[S]^T} \cdot [R] \qquad \text{eq. 5}$$

$$\text{for } [A] = (a_{j,k}) \quad [A]^T = (a_{k,j})$$

where $\overline{[S]^T}$ is the transpose conjugate of $[S]$. The transpose matrix is determined by the following operation on any matrix $[A]$ where the matrix element lying in the jth row and the kth column is designated by $(a_{j,k})$ $$\text{for } [A] = (a_{j,k}) \quad [A]^T = a_{k,j}) \qquad \text{eq. 6}$$

In other words the transpose of $[A]$ is obtained by interchanging the rows and columns of $[A]$.

The complex conjugate matrix is determined by the following operation on the matrix elements $a_{j,k}$:

$$\begin{aligned}
&\text{for } [A] = (a_{j,k}) \quad \overline{[A]} = \overline{(a_{j,k})} \qquad \text{eq. 7}\\
&\text{i.e. for } a = e^{i\theta} \quad \overline{a} = e^{-i\theta}\\
&\text{or } a = x + iy \quad \overline{a} = x - iy\\
&\text{where } x = \cos\theta, \quad y = \sin\theta
\end{aligned}$$

The multiplication of two matrices [A], [B] may be performed where the number of columns of the first matrix [A] is the same as the number of rows in the second matrix [B]. For this application the element in the jth row and the kth column of [M] is determined by multiplying each element of the jth row of $$\overline{[S]^T}$$

by the corresponding element of kth column of [R] and then summing the resulting product terms. This operation may be illustrated for one pattern as follows:

$$m_{j,k} = \overline{s_{1,j}} \cdot r_{1,k} \quad \{or \ e^{i(\Phi k - \theta j)}\} \qquad eq. \ 8$$

where $$\overline{s_{1,j}} = e^{-i\theta j}$$
$$r_{1,k} = e^{-i\Phi k}$$

Note that the elements $m_{j,k}$, $\overline{s_{1,j}}$ and $r_{1,k}$ are vectors which may be represented by complex numbers. In the above example, only one pattern is encoded (p=1) therefore, as per equation 3, [S] is a 1 by N matrix and [R] is a 1 by M matrix. The following standard complex number addition and multiplication operations may be performed to determine the real (Re) and imaginary (Im) components of $m_{j,k}$:

$$Re(m_{j,k}) = Re(\overline{s_{1,j}}) \times Re(r_{1,k}) - Im(\overline{s_{1,j}}) \times Im(r_{1,k}) \qquad eq. \ 9$$

$$Im(m_{j,k}) = Re(\overline{s_{1,j}}) \times Im(r_{1,k}) + Im(\overline{s_{1,j}}) \times Re(r_{1,k}) \qquad eq. \ 10$$

One may express the element $m_{j,k}$ as a vector with phase angle $\Phi^*_{j,k}$ and magnitude $(\lambda_{j,k})$ in the following exponential form:

$$m_{j,k} = \lambda_{j,k} \ e^{i\Phi_{j,k}^*} \qquad eq. \ 11$$

The following standard operations may be performed to evaluate the phase and magnitude components:

$$\Phi_{j,k}^* = \arctan\left[\frac{Im(m_{j,k})}{Re(m_{j,k})}\right] \qquad eq. \ 12$$

$$\lambda_{j,k} = [Re(m_{j,k})^2 + Im(m_{j,k})^2]^{\frac{1}{2}} \qquad eq. \ 12$$

Note that the arctan function produces a value between $-\pi/2$ and $+\pi/2$, therefore $\Phi^*_{j,k}$ must be adjusted for the correct principle angle.

The above elements of matrix [M] represent the encoded information for one (1) stimulus-response pattern. [M1] shall denote the correlation matrix for this pattern 1. The above technique may be expanded to encode a large number of stimulus-response patterns onto the same memory space. To illustrate this concept, the encoded matrices for stimulus-response patterns 1 through to P may be denoted by:
to [M1], [M2], [M3], ... [Mp]

[M2] would denote the encoded matrix for a second stimulus response pattern where for example [S] may represent data obtained from video digitizing equipment when viewing an object such as a pear, while [R] would numerically present an ASCII representation of the word PEAR.

All of the above stimulus-response patterns may be encoded onto the same vector matrix by performing the following matrix addition operation:

$$[X] = [M1] + [M2] + [M3] + \ldots + [Mp] \qquad eq. \ 14$$

The matrix addition operation (+) follows the following rules:

$$\text{for } [A] = (a_{j,k}), [B] = (b_{j,k}) \qquad eq. \ 15$$

$$[A] + [B] \rightarrow (a_{j,k} + b_{j,k})$$

Again where $a_{j,k}$ and $b_{j,k}$ represent complex values.

To illustrate explicitly, the above operations produce a correlation matrix [X] which encodes in an abstract form the elements of the stimulus-response patterns ($s_{p,j}$ and $r_{p,k}$) for multiple patterns p=1 to P and the result may be expressed in the following matrix form:

$$[X] = \begin{bmatrix} \sum_p e^{i(\Phi_{p,1}-\theta_{p,1})}, & \sum_p e^{i(\Phi_{p,2}-\theta_{p,1})}, & \ldots \\ \sum_p e^{i(\Phi_{p,1}-\theta_{p,2})}, & \sum_p e^{i(\Phi_{p,2}-\theta_{p,2})}, & \ldots \\ \sum_p e^{i(\Phi_{p,1}-\theta_{p,3})}, & \sum_p e^{i(\Phi_{p,2}-\theta_{p,3})}, & \ldots \\ \vdots & \vdots & \end{bmatrix} \qquad eq. \ 16$$

Again where $\theta_{p,j}$ corresponds to the translated vector orientation for element j within pattern p for the stimulus field[S]

$\Phi_{p,k}$ corresponds to the translated vector orientation for element k within pattern p for the response field[R].

and p=1 to P patterns are encoded

For each element within [X], $(x_{j,k})$ sums the vector differences between element j in the stimulus field and element k in the response field over all encoded patterns. For example, matrix elements $x_{2,1}$ sums the vector differences between element 2 of the stimulus field and element 1 of the response field, with vector differences summed over all patterns p=1 to P. The above procedure achieves a state in which information pertaining to the stored patterns are superimposed and stored onto the same numerical value, memory location or space.

DECODING

The decoding operation is related to the associative recall of the appropriate encoded on "learned" response. This operation consists of obtaining or reading data corresponding to an input stimulus. In other words one may focus the video digitizing equipment upon the image of an apple to generate the associated numerical data representative of the visual image. This data may be represented as a set of numeric values. i.e.:

$$[S]' = [s_1, s_2, s_3, \ldots s_N] \qquad eq. \ 17$$

The elements of matrix [S] are then translated into a set of vectors ($e^{1\xi n}$) oriented on a complex or 2-dimensional plane as previously described, thus producing a vector matrix (1 by N) as follows:

$$[S]^* = [e^{i\xi 1}, e^{i\xi 2}, e^{i\xi 3} \ldots e^{1\xi N}] \qquad eq. \ 18$$

Again for purposes of illustration the simplifying assumption is made that the magnitude component of each element is equivalent to unity.

The decoding operation consists of performing the following vector matrix multiplication operation to generate a set of response values represented as follows by matrix [R]:

$$[R] = \frac{1}{c}[S]^* \cdot [X] \quad \text{eq. 19}$$

where c is a normalization factor (i.e. may be assigned as the number of elements N within the input stimulus field or may be any function of the $s^*_j, x_{j,k}$ elements themselves).

The above vector matrix operation produces a solution for elements $r_k$ within the response field [R]. The phase component of $r_k$ represents information, and the magnitude component of $r_k$ is statistically proportional to the degree of recognition or correspondence between the stimulus pattern [S]* and any encoded pattern [S] over p=1 to P. Representing the elements of the above matrices by $[S]^* = (s^*_j)$ and $[R] = (r_k)$, equation 19 may be expressed in the following summation form:

$$r_k = \frac{1}{c} \sum_{j=1}^{N} s^*_j x_{j,k} \quad \text{eq. 20}$$

again where:
N is the number of elements within the stimulus field
elements $r_k$, $s^*_j$ and $x_{j,k}$ are vectors normally represented by complex numbers
c is a normalization factor The mathematical operations performed within the vector matrix operation defined by equation 20 are similar to those defined within equations 8 to 13. This operation produces a phase and magnitude component associated with each element $r_k$ within the response field [R].

Representing the above matrix operation in exponential form, each element of the response vector matrix [R] may be determined from the following equation:

$$r_k = \underbrace{\frac{1}{c} \sum_{j=1}^{N} e^{i\xi_j}}_{\substack{\text{element } k \text{ of} \\ \text{response matrix} \\ [R]}} \cdot \underbrace{\sum_{p=1}^{P} e^{i(\Phi_{p,k} - \theta_{p,j})}}_{\substack{\text{elements of} \\ \text{correlation} \\ \text{matrix } [X]}} \quad \text{eq. 21}$$

$$\underbrace{\phantom{\frac{1}{c} \sum_{j=1}^{N} e^{i\xi_j}}}_{\substack{\text{elements of} \\ \text{input stimulus} \\ [S]^*}}$$

Providing the input stimulus field [S]* is equivalent or similar to a prior encoded stimulus pattern (i.e. [S] for any pattern $p^*$), the phase angle within the generated output response will be equivalent to the encoded or learned response phase angle for pattern p* including, however, a deterministic error contribution. This error contribution increases with the number of patterns stored and the vector summation properties as illustrated by equation 21 are roughly analogous to the characteristics of Brownian motion for the uncorrelated patterns. The deterministic error contribution, as a function of the number of elements within the stimulus field (N), the number of patterns stored (P), and for P/N ratios less than 0.25, may be approximated by:

$$\text{error} = \frac{1}{\pi} \arctan \sqrt{\frac{P}{8N}} \quad \text{eq. 22}$$

The above represents the standard deviation for the deterministic error component assuming near symmetry is attained (ie. uniform probalistic distribution of vectors about the complex plane as occurring for instance within a translated set of random uncorrelated patterns). As Table 1 illustrates, a ratio of 0.25 patterns (P) to elements within the stimulus field (N) produces a relative error of approximately 5%.

It should be noted that the encoded stimulus-response patterns may represent completely non-linear and independent functions. As mentioned previously, the error term within the output response is deterministic. The characteristics at this "error" term and a general descriptive form for the decoded response elements ($r_k$) is illustrated in a more rigorous fashion below.

For illustrative purposes a pattern variance term will be defined as the degree of correspondence between a stimulus pattern encoded within matrix [X] and the input stimulus pattern [S]*. This pattern variance may be defined mathematically as follows:

$$\sigma_p^2 = \sum_{j}^{N} \frac{(\theta_{p,j} - \xi_j)^2}{N} \quad \text{eq. 23}$$

During a decoding operation there may be a number of encoded patterns which are similar to the input stimulus (low pattern variance $\sigma_p^2$) however with varying degrees of correspondence. The output response generated on decoding a stimulus can be represented as a summation of response vectors, with each response vector resulting from a stimulus transformation through one of the encoded stimulus-response patterns (p=1 to P) within the correlation matrix [X]. Applying equation 21 with a simplification that only one element exists within the response field (eliminating the k index), the following expansion formula for the output response vector may be obtained:

$$r = \frac{1}{c}(\lambda_1 e^{i\gamma_1} + \lambda_2 e^{i\gamma_2} + \ldots + \lambda_p^* e^{i\gamma_p^*} + \ldots + \lambda_N e^{i\gamma_N}) \quad \text{eq. 24}$$

$$= \frac{1}{c} \sum_{p=1}^{N} \lambda_p e^{i\gamma_p}$$

where
$\lambda_p$ is the magnitude for the portion of the response vector corresponding to a stimulus transformation through encoded pattern p
$\gamma_p$ is the phase angle for the portion of the response vector corresponding to a stimulus transformation through encoded pattern p Each of the summation terms in equation 24 displays a varying dominance or magnitude ($\lambda_p$) which statistically is inversely proportional to the pattern variance (eq. 23). In other words, the encoded patterns most similar to the input stimulus pattern [S]* produce the more dominant contribution within the generated response output (r).

Substituting equation 21, each term within the response summation form (eq. 24) may be evaluated as:

$$\lambda_p e^{i\gamma_p} = \frac{1}{c} e^{i\Phi_p} \sum_j^N e^{i(\xi_j - \theta_{p,j})} \qquad \text{eq. 25}$$

From the above exponential function the magnitude and phase components for the response summation form (eq. 24) may be evaluated as follows:

$$\lambda_p = \frac{1}{c}\left[\sum_j^N \cos^2(\xi_j - \theta_{j,p}) + \sum_j^N \sin^2(\xi_j - \theta_{j,p})\right]^{\frac{1}{2}} \qquad \text{eq. 26}$$

$$\gamma_p = \arctan\left[\frac{\sum_j^N \sin(\xi_j - \theta_{j,p} + \Phi_p)}{\sum_j^N \cos(\xi_j - \theta_{j,p} + \Phi_p)}\right] \qquad \text{eq. 27}$$

(Note that the arctan function produces a value between $-\pi/2$ and $+\pi/2$, therefore $\gamma_p$ must be adjusted for the principle angle).

To further illustrate the characteristics of the above response summation the following limit theorum is presented. Assuming that the elements ($\xi_j$) within the stimulus field closely resemble an encoded pattern (indicated as p* in equation 24).

then $e^{i\xi_j} = e^{i(\gamma_p* j + \epsilon r)}$ over all j=1 to N  eq. 28 where $\epsilon r$—random error term resubstituting into equation 26 and 27, then $$\lambda_p^* = \frac{1}{c}\left[\sum_j^N \cos^2(\epsilon r) + \sum_j^N \sin^2(\epsilon r)\right]^{\frac{1}{2}} \qquad \text{eq. 29}$$

$$\gamma_p^* = \arctan\left[\frac{\sum_j^N \sin(\Phi_p^* + \epsilon r)}{\sum_j^N \cos(\Phi_p^* + \epsilon r)}\right] \qquad \text{eq. 30}$$

(Noting again that $\gamma_p*$ *must be adjusted for the principle angle*).

As the elements of the stimulus field tend toward the encoded stimulus pattern (p*): $\epsilon r \to 0$ then $$\lambda_p^* \to \frac{N}{C} \qquad \text{eq. 31}$$

and $$\gamma_p^* \to \Phi_p^*$$

The value $N_C$ gives the magnitude component for the pattern (p*) within equation 24 and represents the most dominant vector for a perfectly correlated pattern match. The phase angle $\gamma_p*$ corresponds to the encoded response ($\Phi_p*$) for pattern $_p*$.

Using a similar method of illustration, as the elements of the stimulus pattern ($\xi_j$) randomly diverge from an encoded pattern $_p*$, a limit may be assumed whereby a flat probabilistic distribution for r is presented within the Argand plane. In the limit of a total non-correlation between the stimulus field and encoded pattern, the vector summation term for pattern $_p*$ (as defined in a general form by equation 25) follows a random walk path analogous to Brownian motion. The characteristics of the Brownian motion scenario may be applied, thus indicating that the magnitude function (equation 26) approaches a normal probabilistic distribution centered about the origin (ie. $\lambda_p=0$) with a standard deviation given by:

$$\sigma\lambda = \underline{N}_C$$

Again in the limit of complete non-correlation between input stimulus [S]* and encoded pattern ($_p*$), the generated response phase angle $\gamma_p*$ is deterministic but largely independent or uncorrelated with respect to the encoded response ($\Phi_p*$).

The above characteristics develop a system whereby the encoded patterns most similar to the input stimulus [S]* contribute a dominant effect on the output response, and the uncorrelated patterns are expressed as a deterministic error.

To reiterate an initial point, information is stored in the form of stimulus-response patterns over a series of frames (generally with respect to time), one may represent the stimulus field as a two dimensional complex vector matrix [S] with the set of vectors (complex numbers i.e.

$$e^{i\Theta 1} \text{ to } N)$$

representing each element of the stimulus field along the row or horizontal, and the pattern index or "time" along the column or vertical i.e.:

$$[S] = \begin{matrix}\text{time}\\ \text{index}\end{matrix}\Bigg\downarrow\begin{pmatrix} e^{i\theta t1,2}, & e^{i\theta t1,2}, & e^{i\theta t1,3}, & \ldots \\ e^{i\theta t2,1}, & e^{i\theta t2,2}, & e^{i\theta t2,3}, & \ldots \\ e^{i\theta t3,1}, & e^{i\theta t3,2}, & e^{i\theta t3,3}, & \ldots \\ \cdot & \cdot & \cdot & \\ \cdot & \cdot & \cdot & \end{pmatrix} \quad \text{eq. 33}$$

$\xrightarrow{\text{element index}}$

A VECTOR MATRIX shall be defined as a matrix whose elements are vectors (i.e. complex numbers having a particular orientation on the Argand plane).

The response field [R] corresponding to the above stimulus patterns could be represented in a similar fashion but, for purposes of illustration, will be assumed to have only a single element. Again the pattern or time index is along the column or vertical, i.e.:

$$[R] = \begin{matrix}\text{time}\\ \text{index}\end{matrix}\Bigg\downarrow\begin{pmatrix} e^{i\phi t1}\\ e^{i\phi t2}\\ e^{i\phi t3}\\ \cdot\\ \cdot \end{pmatrix} \quad \text{eq. 34}$$

As described previously the following matrix operation is required to encode the data corresponding to the above (stimulus-response patterns) into a single vector matrix [X]:

$$[X] = \overline{[S]^T} \cdot [R] \qquad \text{eq. 35A}$$

where $$[S]^T$$

is the transpose conjugate of [S].

The product of the above operation, the correlation matrix [X] is an N by 1 matrix where N is the number of elements in the stimulus field. This encoding operation (equation 35A) produces a matrix of the following form:

$$[X] = \begin{bmatrix} \sum_{\text{over } t} e^{i(\Phi_t - \theta_{t,1})} \\ \sum_{\text{over } t} e^{i(\Phi_t - \theta_{t,2})} \\ \sum_{\text{over } t} e^{i(\Phi_t - \theta_{t,3})} \\ \cdot \\ \cdot \\ \cdot \end{bmatrix} \quad t\text{ - time index} \qquad \text{eq. 35B}$$

The resultant effect of the above operation is that the dimension corresponding to time has been collapsed.

In essence, the method by which the process operates is that a response value corresponding to any of the stored stimulus-response patterns can be regenerated at any time by inputting a previously encoded stimulus pattern to the device (again recalling that the stimulus pattern could be a picture, a spoken word, or other parameter, and the response could be the associated word, control action, respectively). This response decoding operation is performed as represented by equation 19 and contains an associated deterministic error as approximated by equation 22.

ANALOGY OF THE BIOLOGICAL SYSTEM

In order to fully understand the operational characteristics and implications of this device it is useful to provide an analogy between the AS device described herein and the neurobiological system.

Current estimates indicate that the human brain possesses between 100 and 1000 Billion neurons. Like all animal cells, each neuron is bounded by cell membrane and contains a nucleus. The size and the shape of these neurons vary widely, but the structural plan always contains certain elements as shown in FIG. 2: a cell body or soma, and the processes from this cell body, namely an axon (neurite) and usually several dendrites. The classification of the neuronal processes in terms of an axon and several dendrites is made on the basis of function. The axon links the nerve cell with other cells. The axons of other cells terminate on the dendrites and also on the soma. The axon and dendrites normally divide into a varying number of branches after emerging from the soma. The junction of an axonal ending with another cell is called a synapse. Neurons may have up to several thousand synaptic connections depending upon function.

Information propagation within the neuron occurs in the following general fashion; with signals relayed in the form of pulse modulated waveforms received via the dendrites and soma and mediated via the synaptic connections. Conversely, in response to the input signals received as above, the neuron generates an output pulse modulated waveform which travels via the axon to subsequent layers of neurons. The general structure of the neuron with respect to the signal pathways is illustrated in FIG. 3.

The process described in the previous section will be reiterated within the context of the following description, as a possible mechanism for information processing within the biological neuron. It is proposed that the biological neuron stores information in the form of stimulus-response patterns and follows a similar encoding/decoding mechanism as defined in the section pertaining to theory.

As mentioned above each synaptic connection within the dendritic structure of the neuron receives a pulse modulated wave form characteristic of FIG. 3. These waveforms may be represented in a general and abstract form with pulse frequency representative of a vector phase angle and pulse magnitude representative of a vector magnitude. The stimulus signals therefore received via the synaptic connections may be expressed in a abstract mathematical form by:

$$[S] = (\lambda_1 e^{i\theta_1}, \lambda_2 e^{i\theta_2}, \lambda_3 e^{i\theta_3}, \ldots \lambda_N e^{i\theta_N}) \qquad \text{eq. 36}$$

where $\lambda_j$ - represents magnitude component for element j $\theta_j$ - represents the phase angle component for element j Similarly the output or response waveform relayed via the axon may be represented by a single element consisting of a vector phase angle and vector magnitude component:

$$R = \lambda_{\text{out}} e^{i\theta} \qquad \text{eq. 37}$$

Applying the Hebb Hypothesis, the information content within the neuron itself is contained within or near the synaptic connections. No claims or explanation is presented as to the biological mechanism by which this information is stored, it is proposed that the information is encoded or learned however via a variation of the general transformation as defined previously and given below:

$$[X] = \overline{[S]^T} \cdot [R] \qquad \text{same as eq. 35A}$$

Again representing [X] in complex exponential form with each element consisting of a vector phase angle and magnitude component:

$$[X] = \begin{bmatrix} \sum_{p=1}^{P} \text{out}_p \cdot e^{i(\Phi_p - \theta_{p,1})} \\ \sum_{p=1}^{P} \text{out}_p \cdot e^{i(\Phi_p - \theta_{p,2})} \\ \cdot \\ \cdot \\ \cdot \\ N \text{ synapses} \end{bmatrix} \text{ an } N \text{ by 1 matrix} \qquad \text{eq. 38}$$

where p is the pattern index and p=1 to P patterns are encoded.

As indicated within the section pertaining to theory of operation, [X] contains the encoded set of stimulus-response patterns, represented in an abstract form (complex numbers or vectors) The corresponding information is superimposed upon the same storage medium, that is, the synapse or area of the synaptic connection.

For the decoding operation, on stimulation of the dendritic synaptic connections (see FIG. 3) by a series of externally generated pulse modulated waveforms, the analogy is made is that the following transformation is performed within the body of the cell:

$$R = \frac{1}{c}[S]^* \cdot [X] \qquad \text{same as equation 19}$$

[S]*—is the input stimulus signal received via the dendritic synaptic connections.

c—is a normalization factor (i.e. number of elements N in input stimulus field or any function).

R—is the vector output element whose phase angle and magnitude component represents the generated waveform; travelling via the neural axon and collaterals to subsequent layers of neurons.

The operational characteristics of a single hypothetical neuron which follows the described process has been determined theoretically, verified by computer simulation for a smaller scale system and described below.

For this illustration a model is roughly based on the Purkinje cell located in the Cerebellum. Current study indicates that this type of neuron is functionally related to memory and contains up to 250,000 dendritic synaptic connections. The number of stimulus-response patterns which may be encoded into a single hypothetical neuron having a similar structure to the Purkinje cell has been determined applying the following assumptions:

1) the encoded stimulus-response patterns are random and uncorrelated with respect to previously encoded patterns (i.e. symmetrical distribution about a complex plane).
2) the relative error within the phase angle component for the output response R is $\approx 5\%$.
3) the number of synaptic connections (N) is 250,000.

Applying error equation 22, the number of stimulus-response patterns (P) that may be stored in a single neuron is:

$$P = N[\tan(.05 \pi \sqrt{8})]^2 \qquad \text{eq. 40}$$
$$= 56{,}600 \text{ patterns}$$

Each stimulus-response pattern corresponds to 250,000 elements of information(N), therefore the total amount of information ($\Omega$) represented by the series of encoded patterns is given by:

$$\Omega = P \times N = 14{,}156{,}000{,}000 \qquad \text{eq. 41}$$
$$= 1.4 \times 10^{10} \text{ elements}$$

It is therefore indicated that approximately 14 billion elements of information may be encoded into the hypothetical neuron. Upon stimulation via the dendritic synapses, the characteristics of the above hypothetical neuron are such that the input signal is transformed through all of the above accumulated information to issue a response waveform in a near instantaneous fashion, with the above process performed several times per second. This analogy suggests that if the neuron in fact emulates the above process; the biological neuron as a single and separate entity, is an extremely powerful computational element.

Within a multineuronal system, applying the above process, each neuron may operate in an independent or non-syncronous manner. The interneuronal synaptic connections may be configured to produce a highly associative memory capability, extending across all forms of sensory modalities.

Most importantly, the above process defines a mechanism for storage for an extremely vast amount of information, potentially analogous to a lifetime of accumulated stimulus data, again derived from all forms of sensory modalities. The decoding process illustrates a mechanism by which the neurobiological system could process incoming sensory stimulus through the above accumulated lifetime of encoded information, to issue a response in a near instantaneous manner.

PHYSICAL EMBODIMENT OF DEVICE—ELEMENTARY MODEL (FIG. 4)

An innumerable variety of physical configurations or hardware embodiments of the process described herein may be conceived. The intent is to illustrate one example of a physical embodiment of an artificial neural device employing the described ANS process. The hardware embodiment of the ANS device however is not limited to any particular type of device configuration or information storage or processing medium.

The hardware embodiment is illustrated in FIG. 4. In this example, sixteen stimulus inputs are shown. It is expected that analogue signal multiplexing techniques would be employed to increase the number of elements within the stimulus field [S] to any desired number. The input signals are oscillating wave forms with the vector phase information represented by frequency and vector amplitude represented by signal amplitude. This illustration is analogous to the neurobiological waveform signal.

Employing the above mechanism for information transmission(oscillating wave or pulse modulated signal) also realizes an advantage in that only one line is required to transmit both phase angle and magnitude components of the signal.

During an encoding operation the input stimulus field elements (1 to 16) are transformed into a digital representation of phase angle and magnitude via the demodulating circuit (A). A separate phase and magnitude component is determined for each of the input stimulus elements. The associated output response for encoding is read in via demodulating circuit (E) and similarly converted into a digital representation of the phase angle and magnitude components. The digital encoding unit (F) performs the complex vector transformation as defined within equation 35A to encode the stimulus-response pattern into storage unit (C). Unit (C) stores the encoded information and represents the axo-dendritic synaptic analog.

During a decoding operation the input stimulus signal elements are transformed into a digital representation of phase angle and magnitude via the demodulating circuit (A). As above, separate phase and magnitude components are determined for each of the input stimulus field elements. The decoding unit (B) reads the binary representation of the input stimulus signals and reads the corresponding encoded vector elements [X] from unit (C). The appropriate elements of [X] may be determined via an address enable IN bus controlled by external logic. Unit (B) performs the decoding operation defined by equation 19 using the input stimulus elements [S] from unit (A) and the encoded elements [X] from unit (C) The output response is transmitted to the frequency modulator unit (D) which converts the binary representation of the vector or complex number into a waveform with frequency representative of vector phase angle and signal amplitude representative of the vector magnitude.

Several of these neural elements may be connected together in any configuration to form an array of neural elements operating in a simultaneous or massively parallel fashion.

Applications of the Artificial Neural System

The following illustrates six ANS devices that may be derived from the process referred to earlier. A virtually unlimited number of devices and applications may be conceived, however the purpose here is to illustrate the range of applications to which the ANS device as described herein may be employed.

Pattern to Voice Transcription (Vision Recognition)

A vision recognition device embodying the invention as described above is schematically depicted in FIG. 5. The visual recognition device comprises conventional hardware for capturing and input of the visual data for encoding/decoding via the system. This device 1 employs the use of a single transformation group (TG) to perform the visual to auditory conversion, and employs no use of further optimizing techniques to enhance performance (i.e. Hermittian processing of input data).

Figure 6C:
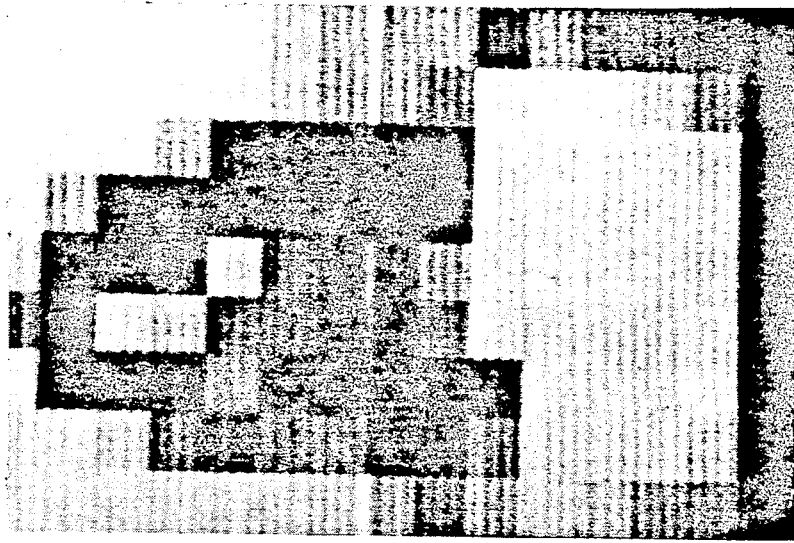
FIGS. 6a–6c illustrates a digitized visual image represented by pixels within the visual field.
Figure 6B:
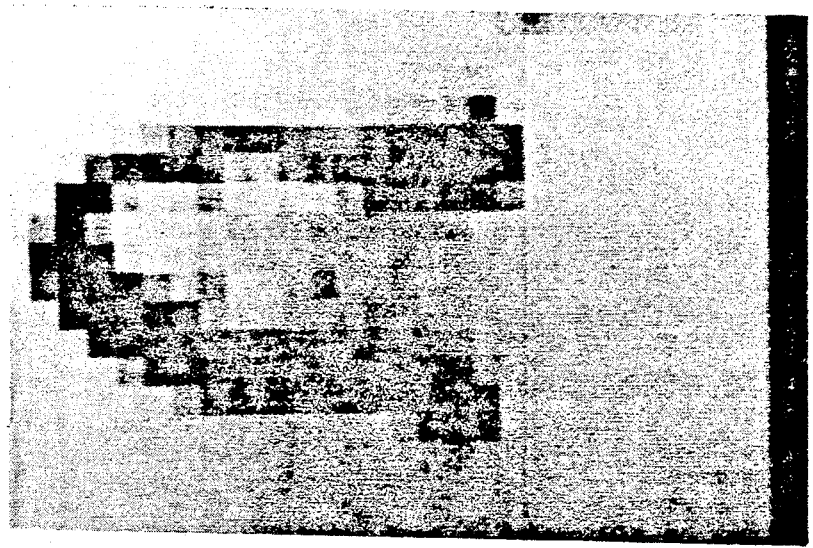
Figure 6A:
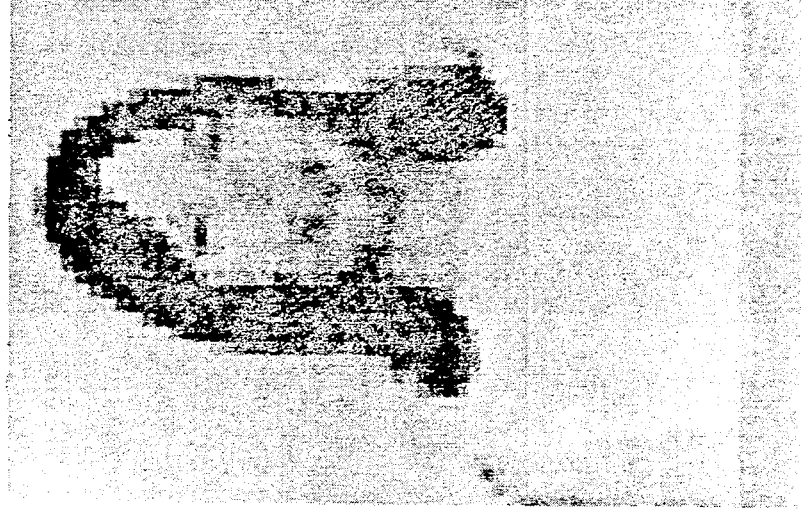
Figure 10C:
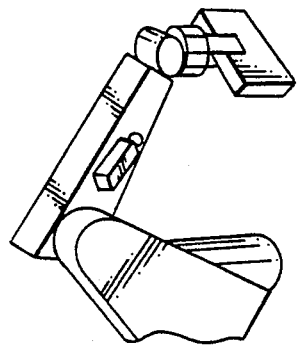
Figure 10F:
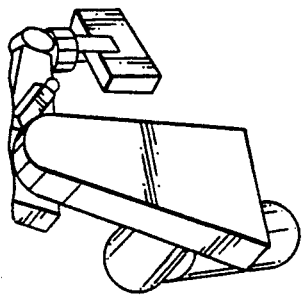
Figure 10B:
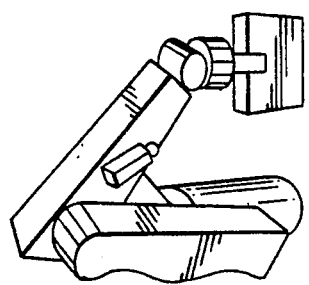
Figure 10E:
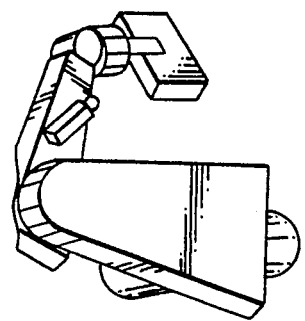
Figure 10A:
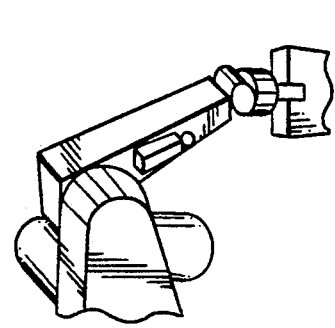
Figure 10D:
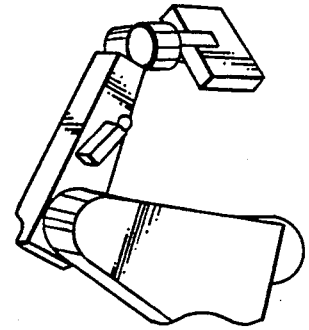

The hardware requirements for the device 1 are as follows:

(a) video camera 2 capable of generating a standard analog video output;

(b) a digitizing device such as a video signal digitizer 3 capable of receiving analog video signal input. This digitizing device 3 separates the video scan line inputs into an array of "pixels". In one application consider a pixel field of 64 by 64. Each pixel is represented by a value which is proportional to the average intensity of the scan lines within that pixel field, as shown in FIG. 6.

(c) an ANS processor capable of storing and processing data or signal information. The artificial neural system may be embodied by any physical hardware (specialized or general purpose) configured to perform the required process as described earlier.

(d) the auditory output device 11 may consist of a digital to analog convertor and a series of voltage controlled oscillators. Essentially the output device 11 transforms the binary representation of the output response into the desired sound at the speaker 12.

In order to simplify this example one may assume that a series of phonemes comprising the output response will be encoded and the hardware handles the translation from phoneme to spoken output. Each spoken word consists of a list of phonemes. Approximately 36 phonemes are required to verbalize the majority of phrases within the English language. Using the artificial neural system described herein the visual data stream generated by the video signal digitizer 3 (series of pixel values) is translated to a verbal output (list of phonemes) at speaker 12.

The encoding/decoding procedures performed within the process are illustrated as follows:

Encoding

The video digitizing equipment 2 generates for example a series of 4096 bytes which represents a field 64 by 64 pixels for visual input. For this application the pixel input values should be translated into vector phase angles 5 such that they fall within the range of 0 to $2\pi$.

The visual input field shall be represented as [S]. The corresponding output response 10 for that visual stimulus is either a spectral harmonic representation for the spoken word, or an equivalent list of phonemes each defined by a numeric representation; the later shall be illustrated for simplicity. For example, assuming that the video camera 2 is focused on a picture of a house and the response is to be utterance of the word HOUSE. This word may be reconstructed with 4 phonemes: h, o, u, s. The representation for these four phonemes must be encoded into Memory and ANS processor 1. A total of 36 phonemes (See FIG. 7) may be chosen to make up the sound therefore a selection mechanism must be determined. For convenience, two base 6 numbers have been chosen to represent the choice of phonemes (i.e. $6^2 = 36$ possibilities). Each base six number is represented by two elements in the output response field [R]. Allowing for a capacity for 4 phonemes to be encoded requires 8 elements within the output response field [R].

Information as it is processed within this ANS system (5 and 6) is represented by a phase angle component with magnitude set equivalent to unity. In representing a base six digit, the complex plane must be divided into 6 sections, each section separated by 60 degrees. For example, to encode a "0" a phase angle of $\pi/3$ must be assigned, similarly:

1 - $2\pi/3$
2 - $\pi$
3 - $4\pi/3$
4 - $5\pi/3$
5 - $2\pi$

Therefore, for the response h, o, u, s the encoded output would consist of the following:

$$[Y] = (\underbrace{\pi,\pi/3}_{h},\underbrace{\pi/3,4\pi/3}_{o},\underbrace{2\pi,\pi/3}_{u},\underbrace{5\pi/3,\pi/3}_{s}) \quad \text{eq. 42}$$

The actual phoneme response could be input via the keyboard 13 and the conversion to a set of complex values (phase angle 0 to $2\pi$) performed. The input stimulus [S] and encoded response [Y], transformed into vectors by units 5 and 6, compromise the data fed into the artificial neural system encoding processor 9. A correlation matrix [X] is generated and stored in volatile memory 8 accessible to the ANS decoding and encoding processors 7 and 9. The stimulus-response patterns are encoded into the correlation matrix [X] via the ANS processor 9 performing the following operations. These steps are performed for each element $(x_{j,k})$ within the correlation matrix [X]:

1. Read the phase [Ph] and magnitude (Mag) components for each element of $(x_{j,k})$ and convert into real (Re) and imaginary (Im) parts. Store the converted values in a data buffer within the ANS encoding processor 9.

2. Read the phase angle (Ph) component for element $(s_j)$ from the input stimulus array [S], and element $(y_k)$ from the encoding response array [Y]. Place these values in buffers within the ANS encoding processor 9.

3. Perform the following logical operations within the ANS processor 9:

$$Re(x_{j,k}) = \text{COS}\ [Ph(y_k) - Ph(s_j)] + Re(x_{j,k}) \quad \text{eq. 43}$$

$$Im(x_{j,k}) = SIN[Ph(y_k) - Ph(s_j)] + Im(x_{j,k}) \quad \text{eq. 44}$$

4. Determine the phase angle (Ph) and magnitude (Mag) for the j,k component of [X] by employing the following operations:

$$Ph(X_{j,k}) = \arctan\left[\frac{Im(X_{j,k})}{Re(X_{j,k})}\right] \quad \text{eq. 45}$$

note that $Ph(x_{j,k})$ must be adjusted to the correct quadrant.

$$Mag(x_{j,k}) = [Re(x_{j,k})^2 + Im(x_{j,k})^2]^{\frac{1}{2}} \quad \text{eq. 46}$$

Store the phase and magnitude components of the above elements of [X] back into volatile memory 8.

The above illustrates the encoding portion of the process. This process may be repeated to encode any number of stimulus/response patterns into the network. Note that the ANS processor 9 should optimally be configured to perform the conversions (step 3 to 5) in as parallel a fashion as possible. A matrix processing device or configuration within the ANS processor is therefore desirable. The above operation may of course be performed sequentially as in conventional general purpose computing devices, however, processing time may become an inhibiting factor.

Decoding

A similar operation of encoding is performed on decoding a stimulus input into a response. A video signal is generated by video camera 2 and feeds input to video signal digitizer 3 which digitizes the image into a 64 by 64 pixel array. Again the pixel values are proportional to the gray scale or intensity level. Similarly, these pixel values are converted into vectors 5 (i.e. represented by phase angles between 0 and $2\pi$). The stimulus field shall be represented as [S]* and elements of [S]* representing phase angles are read into volatile memory accessible to the ANS decoding processor 7. The following operations are performed on the complex elements within the correlation matrix [X] and the elements within the stimulus field [S]*.

1. Read the phase (Ph) and magnitude (Mag) component for complex elements $(x_{j,k})$ of the correlation matrix [X]. Store the above values in a data buffer within the ANS decoding processor 7.
2. Read the phase angle component of elements $(s^*_j)$ from the stimulus input field[S]* and place the value in a data buffer within the ANS decoding processor 7.
3. Each element $(r_k)$ within the output response field [R] is then evaluated within the ANS decoding processor by performing the following operations. Note that the following is a summation over all j=1 to N elements of $x_{j,k}$ and $s_j^*$.

$$Re(r_k) = \frac{1}{N} \sum_{j=1}^{N} Mag(x_{j,k}) \times COS[Ph(s_j^*) + Ph(x_{j,k})] \quad \text{eq. 47}$$

$$Im(r_k) = \frac{1}{N} \sum_{j=1}^{N} Mag(x_{j,k}) \times SIN[Ph(s_j^*) + Ph(x_{j,k})] \quad \text{eq. 48}$$

The above steps must be performed (i.e. step 1 to 3) for each of the output elements within the response field [R] (k=1 to 8).

4. Following the above summation operation, each element of the output response field [R] is converted by the ANS processor into the corresponding phase and magnitude values as follows:

$$Ph(r_k) = \arctan\left[\frac{Im(r_k)}{Re(r_k)}\right] \quad \text{eq. 49}$$

Noting that an adjustment must be made for the principle angle.

$$Mag(r_k) = [Im(r_k)^2 + Re(r_k)^2]^{\frac{1}{2}} \quad \text{eq. 50}$$

The phase component $Ph(r_k)$ contains the output information (phoneme identification) while the magnitude component provides a value generally proportional to the degree of recognition. The above phase and magnitude components for the output response elements $(r_k)$ as evaluated by the ANS decoding processor, are transferred to the output stage 10.

The above output response elements for [R], are read by an output stage 10 which converts each of the phase values $Ph(r_k)$ into a base 6 number, employing the following conversion formula:

$$\text{value} = INT\left(\frac{3Ph(r_j)}{\pi} - \frac{1}{2}\right) \quad \text{eq. 51}$$

Note that the illustrations pertaining to scalar stimulus and response signal normalization and translation to or from phase angles is an implementation or functional detail and is entirely modifyable depending upon function. The above illustration represents one example out of a nearly infinite variation of conversions or normalization procedures that could be conceived.

6. The base six number values identifying the output phoneme each consist of two digits (output elements). These response values are converted into the corresponding auditory response employing a conventional hardware device for generation of auditory speech output 11.

The above illustrates a very simple application of the ANS device employing only a single transformation group. This application transforms the input sensory modality of vision into the output modality of speech. These visual patterns may be of any form or degree of complexity (i.e. face, general scene, etc.). Due to the non-ideal distribution generated from visual objects the stimulus-response storage capacity, based on a deterministic error criterion, is somewhat reduced over the idealized case as for randomly generated patterns.

A further embodiment related to the memory storage capacity may be performed by preprocessing both the input stimulus field [S] on encoding (step 2) and preprocessing [S]* on decoding (Step 2) into a matrix of Hermittian form. The Hermittian matrix would be formed within the ANS processor by the following operation:

$$[H] = \overline{[S]^T} \cdot [S] \quad \text{eq. 52}$$

where [S] is the complex conjugate of [S].

The resultant effect of the above Hermittian operation is that the visaul stimulus-response pattern storage capacity could exceed 1 Million prior to onset of excessive misclassification error. The above operations would optimally be performed by dedicated matrix processing hardware within the ANS processor device.

This ANS device may potentially display significant advantages over current recognition schemes. The most significant advantage is the high pattern storage capacity. This system achieves a state whereby the information corresponding to several images is encoded in an abstract (complex vector) representation onto the same data storage medium [X]. This "holographic" information storage technique presents significant advantages both in the physical data storage requirements (i.e. size of memory storage device) and the processing time requirement on decoding to a response output.

Voice to Text Transcription

Voice to Text Transcription is another example of the transformation of one form of input sensory modality (i.e. hearing) into an alternate form (i.e. visual transcription). This device would entail encoding and decoding of a voice input stimulus into a visual or typed output. In this application the input stimulus field would consist of a digitized sonogram. A sonogram is one means of expressing auditory data and indicates intensities of harmonic content over a given time axis. An example of a sonogram is presented in FIG. 8. Much like a digitized visual input field, a sonogram may be divided into a pixel field, within frequency along the vertical axis and time along the horizontal.

For this example, assume a resolution for the auditory input along 32 frequencies and 32 time steps. The output field will consist of 12 numerals. These numerals may of course be represented in a similar fashion as presented in the previous example (two base 6 numbers).

The input is therefore the spoken word and the output is a typed response. For a design of the type specified above and assuming an idealized distribution, the number of voice stimulus/typed response patterns that may be encoded prior to excessive misclassification error is given by:

$$P = N [\arctan (Er\pi \sqrt{8})]^2 \quad \text{eq 53}$$
$$= 180$$

where
P = number of stored patterns
N = number of elements in stimulus field
Er = response error (5% assumed in this case)

Again if a second order Hermittian preprocessing configuration is employed (see section pertaining to enhancements of invention) the number of patterns that may be encoded could exceed the 200,000 range. This value greatly exceeds the number of common usage within the English language. A significant advantage could therefore be realized within multi-user systems in that several variations of each word could be encoded, each with varying tones and inflections. This capability would enhance significantly the performance of speaker independent voice recognition systems.

Current voice recognition systems require extensive user training (i.e. voice sampling) however it is expected that a system based on the principle described herein, once encoded with sufficient samples, would not require further programming or training for specific individuals. In addition, due to the nature in which information is encoded onto the same data medium employing this design, it is expected that the processing time would be sufficiently reduced to facilitate sophisticated (continuous speech) real time voice recognition systems.

Robotic Devices

Robotic or cybernetic devices are of course another level of complexity beyond the transformation devices described above. It is expected that for robotic or cybernetic control, arrays of transformation groups (TG) will be required, employing various feedback control modes. FIG. 9 illustrates a one possible multi-TG configuration with feedback.

Implementation of ANS devices based on the process described herein could potentially yield control systems with capabilities beyond current systems. Two applications of the ANS device described herein, and within the realm of robotic control include:

Robotic Arm

The ANS control device as described herein can be utilized with a robotic assembly device, possessing 10 rotational axis and visual input. The feedback mechanism is via visual stimulus and axial joint position/rate of movement. This device consists of two transformation groups, TG1 and TG2.

Transformation group (TG1) would receive inputs indicating axial position (10 elements) and rates of movement (10 elements). This transformation group could employ Hermittian preprocessing (see section entitled Enhancements of Invention) of the stimulus field to greatly increase the pattern storage capacity. By employing fourth order Hermittian preprocessing, the input field could be expanded to 160,000 elements (i.e. $20^4$). This expanded stimulus field could then be supplied to the second transformation group (TG2) receiving stimulus also from a visual field (i.e. 256 by 256 pixel field). The above model provides a total of 244,000 elements within the stimulus field of TG2 for stimulus-response encoding and decoding operations (i.e. 64,000 visual and 160,000 axial position/rate). Employing an N/4 rule for the number of patterns encoded, the number of specific stimulus-response patterns that may be learned by the robotic control system could exceed 60,000. It should be noted however that the relative deterministic errors are expected to be large (5-15%) and inherent feedback control will be necessary to facilitate a practicable robotic control system.

The method of encoding or learning dynamic control response motions for the robotic arm is illustrated simply as follows. The complex movement would be determined as a series of patterns representing visual input, axial position and rates of movement. These patterns would correspond to each incremental movement of the process over a given time frame illustrated rather coarsely in FIG. 10. These stimulus pattern frames could be encoded into the network with the output response pattern corresponding to the next (time) incremental axial position or movement for the robotic device.

It is expected that this relatively simplistic mechanism for encoding and control would yield a robotic control paradigm with capabilities potentially beyond those obtainable employing current control devices or techniques.

Automatically Piloted Vehicular Transportation

In order to illustrate an example of a more complicated control system consider the potential application of an ANS device controlled vehicle. A vehicle is not a robot in the strict sense of the word however may represent a readily visualized example.

The ANS device would serve as inputs the following:
1. Human operator voice
2. Visual input
3. Radar tracking
4. Vehicle control parameters (i.e. speed, acceleration, steering, transport drive indications, etc.)
5. Longitude, latitude and altitude for navigational purposes.

The output response field may consist of the following:
1. Voice output
2. Acceleration
3. Steering An application of this type is ideally suited to the ANS device because there are a very large number of input stimulus elements and relatively few output response elements. It would be expected that a task of this complexity would require several transformation groups. For example, one TG may be encoded to respond to voice input, a second for visual stimulus and a third for position sensors or radar. These transformation groups would feed into subsequent layers of TGs as illustrated in FIG. 9 and eventually the final layer would issue the control action (i.e. acceleration or steering).

Due to the large volume of input data (i.e. visual, radar, voice) the number of input elements is expected to be large (say 200,000 elements). Again assuming an N/4 rule for this pattern distribution, the number of stimulus/response patterns that could be encoded would be in the area of 50,000. If second order Hermittian preprocessing is employed on the stimulus inputs, the pattern storage capacity could potentially exceed 1 Billion. It is expected that this storage capacity could encode sufficient control response actions to cover substantially any potential accident situation or defense manouver, and bring this application into the realm of feasibility.

Expert Systems (Automated Reasoning)

The current mainstream of artificial intelligence applications are based on the Heuristic technique. Heuristics is a term used to define the concept of rule based programming. In general, the approach involves applying multiple decision rules against input states in order to issue a seemingly intelligent response. Heuristics was initially employed within the field of game playing (i.e. chess) and displayed particularly impressive results.

Rule based programming has become the mainstream of AI research and has found more practical applications within the field of expert systems. A large degree of research in this field centers about the development of more efficient searching and parsing mechanisms for traversing the rule based decision tree. The principle drawback within the conventional heuristic approach is that decision rules must be applied and tested in a sequential fashion prior to arriving at a given response or outcome. For expert systems operating within domains involving some degree of complexity, the number of rules and thus search time required increases dramatically, limiting the capabilities of the rule-based approach. A simple, however, direct analogy between the ANS process and functional aspects of the heuristic technique shall be made. The general concept of the decision tree within the heuristic approach is presented below.

The form of the decision tree is represented in FIG. 11. The top event is defined as one possible output and the branching network below describes the boolean relationship which arrives at this top event. The boolean tree describes all conditioning inputs leading to the top decision event in the form of AND and OR relationships (in the simplest case). Multiple decision trees are employed within any expert system. In the example given here:

Event A is true IF $$[B + (C \cdot D \cdot E)] + [G \cdot (B + H)] + [F + K + (I \cdot J)] \quad \text{eq 54}$$

Applying boolean cutset reduction to the decision trees given in the above example yields the following result:

$$\begin{aligned}
&1.\ B \cdot G \cdot H \cdot F + \\
&2.\ C \cdot D \cdot E \cdot G \cdot H \cdot F + \\
&3.\ B \cdot G \cdot I \cdot F + \\
&4.\ C \cdot D \cdot E \cdot G \cdot I \cdot F + \\
&5\ B \cdot G \cdot H \cdot L + \\
&\quad '' \\
&\quad '' \\
&12.\ C \cdot D \cdot E \cdot G \cdot I \cdot J \cdot K
\end{aligned} \quad \text{eq. 55}$$

Each of the above product terms (1 to 12) consists of a series of "anded" conditions, in other words, states that occur simultaneously in time. The above minimal cutsets or "input patterns" may be directly encoded into the ANS device in the form of discreet stimulus-response patterns, the response action being the top event in the decision tree. Each of the above product terms in fact represents a separate stimulus-response pattern and all patterns may be sequentially encoded into the ANS network. The ANS device described herein provides an enormous capacity for storage of stimulus-response patterns and facilitates a mechanism for construction of extremely large heuristic rule based systems.

Information is stored within the ANS network via the superposition of data and the highest correlated response to an input stimulus is arrived at in a massively parallel fashion. It is expected that this inherently parallel technique will yield significant benefits over current heuristic methods in terms of both processing speed and information storage capacity.

It is believed that a significant advantage over the Heuristic technique may also be realized in that the ANS operational characteristics are not of a logical binary (pass/fail) nature but are continous and within a closed range. In addition, each of the encoded scenarios or pattern frames may be completely independent with respect to all other encoded pattern frames without adversely affecting the computational efficiency. This property may potentially facilitate large and complex expert systems which are not amenable to boolean reductionist techniques or solution via Heuristic methods.

A simple example may be used to illustrate the above concept. Consider an expert rule base system consisting of 1,000 input parameters. These inputs would supply information regarding "observables" to induce the expert system based decision or output. Employing second order Hermittian expansion of these inputs yield an ANS device responding to an input stimulus field of 1 million elements. Using an N/4 rule, the number of complete stimulus/response patterns that may be stored by this system could exceed 250,000.

This ANS based expert system would therefore be capable of storing an encoded response for 250,000 scenarios, each consisting of 1000 input parameters. In this example a number 2 base system shall be used for generation of the output response, therefore, 18 binary digits ($\log_2$ 250,000) are required to identify 250,000 distinct scenarios. The number of elements (i.e. transformations required) within the vector correlation matrix [X] is given by:

$$10^6 \times \log_2[M] = 18 \times 10^6 \qquad \text{eq 56}$$

where M = number of possible outcomes (i.e. 250,000)

One could assume that each vector transformation is performed within the ANS processor at a rate of 10 million instructions per second (a computational speed of 10 MIPS is within the capacity of present day microprocessors). It is therefore conceivable that the expert system based on this ANS process would arrive at the highest correlated output decision, based on 250,000 scenarios each comprised of 1000 variables, in approximately 6 seconds.

Again the capabilities of such a device are expected to exceed the abilities of expert systems employing conventional methods.

Neural Prosthetic Devices

The field of prosthetic control could benefit greatly from the application of the ANS device described herein. It is reiterated that the purpose and intent of this device is to provide more efficient information storage and processing capabilities via emulation of the suspected mechanism by which the biological neural system stores and processes information. The specific ANS device described herein, appears to emulate the form of the information processing characteristics within the neuron in many respects, these similarities are outlined below:

i) frequency modulated pulse or waveform,
ii) branching network configuration,
iii) information representation in the form of stimulus-response patterns,
iv) large information storage capacity,
v) near instantaneous single pas generation of output response.

A synthetic system which closely mimics the above biological characteristics would inevitably provide significant advances in the area of interfacing prosthetic device control to neurobiological circuits.

This ANS device would yield significant advances in the area of control for artificial limbs, and it is expected, would inevitably advance towards prosthetics for higher functions.

ENHANCEMENTS OF INVENTION

The ANS device described herein may be modified in several areas to provide enhanced and improved operational characteristics. These enhancements may be realized in the application of Hermittian and sigmoid preprocessing methods, layered networks, modification of the magnitude components of the stimulus-response pattern elements, sparse matrix techniques, methods for establishment of a memory profile, and excitory and inhibitory synaptic connections. These are of course only a limited subset of possible enhancements and are outlined below.

Hermittian Preprocessing of Input Stimulus

The following process vastly improves the characteristics of the ANS device particularly when the input stimulus field consists of a relatively few number of elements. This process greatly increases the number of stimulus-response patterns that may be stored within the artificial neural device for a given number of elements within the stimulus field. The process involves translating the stimulus pattern [S] into a matrix of Hermittian form. The result of which is the formation of a matrix of vectors or complex elements which relate every element in [S] to every other element in [S] as a difference in the vector orientations. The Hermittian matrix [H] is formed by the following operations on the pattern [S]:

$$[H] = \overline{[S]^T} \cdot [S] \text{ or } [H] = [S] \cdot \overline{[S]^T} \qquad \text{eq. 57}$$

To illustrate, consider a 1 by N array for the stimulus pattern [S]:

$$[S] = [e^{i\theta 1}, e^{i\theta 2}, e^{i\theta 3}, e^{i\theta 4}, \ldots] \qquad \text{eq. 58}$$

The transpose conjugate for [S] is given by:

$$\overline{[S]^T} = \begin{bmatrix} e^{-i\theta 1} \\ e^{-i\theta 2} \\ e^{-i\theta 3} \\ \vdots \end{bmatrix} \qquad \text{eq. 59}$$

Performing the matrix multiplication operations defined by equation 45 above produces the Hermittian input field [H]:

$$[H] = \begin{bmatrix} 1, & e^{i(\theta 1 - \theta 2)}, & e^{i(\theta 2 - \theta 3)}, & \ldots \\ e^{i(\theta 2 - \theta 1)}, & 1, & e^{i(\theta 2 - \theta 3)}, & \ldots \\ e^{i(\theta 3 - \theta 1)}, & e^{i(\theta 3 - \theta 2)}, & 1, & \ldots \\ \vdots & \vdots & \vdots & \end{bmatrix} \qquad \text{eq. 60}$$

The elements of the above Hermittian matrix provide the input stimulus field to the ANS device for both encoding and decoding operations. The elements along the diagonal of [H] are vectors oriented along the real axis and provide no information to the system. Further optimization may be realized by substituting the elements of [S] for the elements along the diagonal of [H] (j=k). Any subset of the elements formed within the Hermittian matrix [H] may also be used. One example may be a system in which the two diagonals adjacent to the central diagonal are formed, to illustrate:

$$[H] = \begin{pmatrix} h_{1,1}, & h_{1,2}, & 0, & 0, & 0, & \cdots \\ h_{2,1}, & h_{2,2}, & h_{2,3}, & 0, & 0, & \\ 0, & h_{3,2}, & h_{3,3}, & h_{3,4}, & 0, & \cdots \\ 0, & 0, & h_{4,3}, & h_{4,4}, & h_{4,5}, & \cdots \\ 0, & 0, & 0, & h_{5,4}, & h_{5,5}, & \cdots \\ \cdot & \cdot & \cdot & & & \\ \cdot & \cdot & \cdot & & & \\ \cdot & \cdot & \cdot & & & \end{pmatrix} \quad \text{eq. 61}$$

For small errors in the response field (error less than 10%) simulation results indicate that the output error characteristics still follow the relationship given within equation 22. Considering that the input stimulus field now contains $N^2$ elements, the error characteristic of the output response field therefore follows the following relationship:

$$\text{error} = \frac{1}{\pi} \sqrt{\frac{\arctan}{8}} \left( \frac{\sqrt{P}}{N} \right) \quad \text{eq 62}$$

To illustrate the potential for increased pattern storage capacity applying the above Hermittian processing technique, consider an input stimulus field comprised of 4096 pixels (a visual field of 64 by 64 pixels). To achieve a relative value of 5% for the deterministic error within the output response, assuming random and uncorrelated patterns, the number of patterns that may be encoded (each pattern consisting of 4096 elements) is limited to less than 1000. If the input stimulus field is preprocessed into a Hermittian form employing equation 57, the number of stimulus-response patterns that may be encoded approaches 3.6 million.

The above describes and indicates the characteristics of a second order Hermittian form, although any order greater than 2 may be used to further increase the pattern storage capacity of the system.

Layered Networks

FIG. 12 illustrates a layered network where TG represents a transformation group and refers to a device or set of devices that perform a simple transform operation from a single input stimulus field [S] to a single output response field [R]. A layered network consists of a series of transformation groups TG1, TG2, TG3 in which the output response field from one transformation group or layer (TG1) feeds into the input stimulus field of a higher layer (TG2). Any number of layers may be utilized to form more complex arrays of networks.

Parallel Networks

A parallel network as illustrated in FIG. 13 may be formed in which layers within the Network consist of multiple transform groups operating in parallel. In this case the output response field may feed into any of the input stimulus fields of a subsequent layer in any configuration or arrangement. Any configuration of both layered and parallel transformation groups may be utilized to form a highly complex array of networks.

Feedback Networks

FIG. 14 illustrates a system where the output response fields of neural elements within higher layers feed the effects back into input stimulus fields of neural elements within lower or earlier layers. Any configuration or arrangement of feedback systems may be employed. The ANS device inherently provides feedback control for any situation in which the output response manipulates or modifies the local environment providing the input stimulus, (i.e. feedback via environment). This concept may be visualized within a robotic control systems in which the input stimulus is axial position and rate sensors and the output response is the motor control effectors. Any change in the response output (axis movement) modifies the input stimulus pattern thus effecting the subsequent output response, and so on. It is expected that the above feedback mechanisms will significantly enhance the control capabilities within most applications of the ANS device.

Modifying or Applying Magnitude Component

The form of the equations referred to earlier deal primarily with phase angle, having the magnitude component for the elements within the stimulus field set equivalent to unity. A magnitude component however may be assigned to each of these stimulus elements. This effectively assigns a "weighting factor" and determines the effective dominance of that element within the stimulus field in generating the output response.

Sparse Matrix Techniques

In some applications it may be desirable to eliminate some of the transformation elements within the correlation matrix [X] (equation 16). This effectively produces a matrix, some of whose elements will be null or 0, and will be referred to herein as a sparse matrix. This technique has the effect of reducing the resolution (increasing the deterministic error or fuzziness component) within the output response field, however it reduces the number of transformation operations required (i.e. reduces response or execution time).

Memory Profile

The development of a memory profile refers to a mechanism to establish a relative dominance of encoded or learned stimulus-response patterns as a function of time. Any time variable function or transfer function (i.e. first order lag or decay) may be applied to any element within the correlation matrix [X] in order to establish a memory profile. An example may be illustrated assuming that the components of [X] decay with a first order exponential relationship.

A mathematical relationship for a first order decay may be derived from equation 35B to produce a value for the encoded elements of [X] where:

$$X_j(T) = \sum_{t=0}^{T} e^{j(\Phi_t - \theta_{t,j})} e^{-\frac{(t-T)}{\tau}} \quad \text{eq. 63}$$

where

T—current time frame
$\tau$—decay time constant

For example, stimulus-response patterns learned at an instant one time constant (i.e. 1 hour) in the past will have a relative dominance of 0.368 in comparison to a pattern that has been encoded or learned within the current time frame (T).

Application of the above method within the ANS device establishes a memory profile that determines the predominance of encoded or learned information over any range extending from permanent or long term memory to very short term memory.

INHIBITORY/EXCITORY CONNECTIONS—SIGMOID PREPROCESSING

As mentioned within the section pertaining the Theory, the stimulus and response information as encoded into the network corresponds to a circular range extending over $2\pi$ on a complex plane. Many physical parameters are not directly amenable to scaling within a similar closed range and limitations with respect to applications may be encountered. One example is given in the representation of scalar field intensities in which, by implementation of a closed range (i.e. phase angle within complex plane), the lowest and highest intensities are numerically equivalent or similar. In general, scalar fields are defined by values extending over either a bounded or unbounded region. An example of this may be field intensities or position, potentially extending over a range of 0 to infinity. In order to establish similar ranges for the stimulus-response scalar fields, it is necessary to incorporate the concept of a $+/-$ or inhibitory/excitory assignment for the correlation matrix [X] elements (i.e. synaptic connections). This assignment performs $+/-$ phase angle translations on the input signals arriving at the synaptic connections. It is significant to note that neurophysiological studies indicate the existence of an excitory/inhibitory grouping structure within the biological neuron and particular types of neurons possess both excitory and inhibitory connections within there synaptic arrays.

These inhibitory/excitory assignments must be distributed in such a fashion as to establish symmetry within the numerical process. Symmetry in this case refers to a uniform distribution of generated vectors for the correlation matrix [X] elements about the complex plane (i.e. uniform distribution over the $2\pi$ range). It is reiterated that maximum pattern storage capacity is attained when the distribution of both the stimulus and response vectors are uniform or symmetrical about the complex plane. One means of establishing symmetry would consist simply of creating a balanced distribution of inhibitory/excitory synaptic assignments.

The above inhibitory/excitory assignment concept and the sigmoid function as a preprocessing transformation are intimately related in the application of a bounded or unbounded signal range, as illustrated by the following. For an example one may assume that the stimulus signals, in relation to a pattern recognition application, represent light intensities. Typically this sort of input, as well as a large class of scalar fields representing quantities in physical systems, display an approximate Gaussian distribution as given by the following probablistic distribution function (p.d.f.):

$$p.d.f. = \frac{1}{2\pi} e^{-\frac{1}{2}(x-\mu)^2/\sigma^2} \qquad \text{eq. 64}$$

where
- $\sigma$—standard deviation for distribution
- $\mu$—mean of distribution
- x—scalar field quantity The sigmoid function or variation thereof may be employed to translate scalar quantities within the stimulus field into a near uniform probablistic distribution ranging between 0 and $\pi$. The sigmoid function is commonly used within control theory applications but, more significantly, has been determined empirically a the functional relationship by which receptor neurons respond to input stimulus as illustrated by FIG. 3. The function for processing of stimulus input is given in the following general form:

$$\theta_i = \pi [1 + e^{-f(\sigma, s_i, \mu)}]^{-1}$$
or
$$2\pi$$

where
- $s_i$—stimulus field element i
- $f(\sigma, s_i, \mu)$—any function of $\sigma$, $s_i$, and (i.e. $f(\sigma, s, \mu) = (s_i - \mu)/\sigma$ It is noted that several variations of the above generalized sigmoid function may be employed to optimize performance for specific applications.

As mentioned previously, the synaptic or signal inhibitory/excitory classification is required to establish an open unbounded range for the stimulus/response signals and maintain symmetry of operation. In the case of excitory synapses the input stimulus values (ranging between 0 and $\pi$ as defined by equation 65 above) remain positive and for inhibitory synapses the sign is reversed or made negative (0 to $\pi$) thus approaching the desired symmetry or uniform distribution extending over $-\pi$ or $+\pi$.

The above inhibitory/excitory assignment eliminates the inherent problems encountered for an implicitly closed range which folds onto itself, (i.e. complex plane) and illustrates a means by which naturally occurring distributions (i.e. Gaussian) may be mapped via the sigmoid function onto an optimal uniform probablistic distribution about the complex plane. Furthermore, this enhancement displays a similarity to the physical inhibitory/excitory synaptic structure of the neuron.

PHYSICAL EMBODIMENT OF DEVICE—ADVANCED MODEL (FIGS. 15 AND 16)

This example of a hardware embodiment forms a conceptual basis for a possible future generation computer prototype using the process described herein. This device shall be referred to as a neurocomputer. The neurocomputer is intended to be general purpose in its operational characteristics as facilitated by a reprogramming utility. The programming methodology will be significantly different from conventional programming languages and techniques. Some of the basic categories of modifiable or programmable features required within the neurocomputer programming utility are listed below:

1) specification of the synaptic interconnections or interconnection matrix between neural analogues
2) specification of the excitory inhibitory states for the synaptic interconnections
3) specification of values for encoded data within the correlation matrix [X] (analogous synaptic information)
4) specification of decay coefficients or rate of decay of elements within correlation matrix [X]. This programmable feature establishes the memory profile (i.e. short terms vs long term memory)
5) specification of rate of encoding. This programmable feature modifies the rate of learning
6) specification of Input/Output to external environment. Modifys the mapping of external stimulus input (88 in FIG. 15) onto the analogous synaptic inputs as well as mapping of the response outputs (90 in FIG. 15) onto external devices.

The above forms a basis set of programmable features required for the general purpose neurocomputer device and may be expanded conceptually to permit further enhanced capabilities.

In this example, two principle hardware components are indicated, that is the single chip microcomputer 70 and the memory storage unit 72. The single chip microcomputer is representative of a component currently available in the marketplace and contains the following features:

1) processor unit
2) four serial data input links
3) four serial data output links
4) memory interface unit.

These above functional blocks may interact in any manner; however the illustration provided within FIG. 15 shows only the data flow paths required or related to the prescribed ANS process. The processor unit 84 has been subdivided into 3 functional blocks for illustrative purposes; these functional blocks are listed as follows and are described in further detail below:

1) Decoding 74
2) Encoding 76
3) Other functions 78

In this example, the elements of the input stimulus field [S] and the output response field [R] are transmitted via their real and imaginary parts as binary values. This concept is illustrated below in a representative case for an element $s_j$ within the stimulus field [S]:

$$s_j = \lambda_j e^{i\theta_j} \qquad \text{eq. 66}$$

For example if $\theta = \frac{2\pi}{3}$ and $\lambda = 74$ then $$s_j = -36 + i\,64$$

This can be represented in binary two's complement as:

$s_j(\text{real}) = 11011100$ $s_j(\text{imaginary}) = 01000000$

It is assumed an 8 bit resolution is used for each of the above real and imaginary parts. The elements of the stimulus and the response fields may be transmitted either via the serial data links 80 and 82 or mapped onto the external memory devices (88 and 90). FIG. 15 illustrates the transmission of one element of a stimulus pattern [S] via the serial data link 82.

Encoding (Embodiment in FIG. 15)

During an encoding operation the elements of the stimulus pattern ($s_j$) are read in either via one of the four serial input links, or via the external memory device (88) providing memory mapped input. Similarly, the element or elements of the response pattern may be read into the encoding unit 76 either via the serial links or via the external memory device 88. Note again that for each of the stimulus and response elements, a real and imaginary component derived from the phase and magnitude components of the complex element or vector are read into the encoding unit (76).

The real and imaginary components of the corresponding element ($x_j$) for the correlation matrix [X] is read in from the external memory unit 86. The encoding unit 76 performs the encoding transformation as defined, in general, by the following vector matrix transformation:

$$[X] = \overline{[S]^T} \cdot [R] \qquad \text{same as eq. 35}$$

The above operation superimposes the learned stimulus-response patterns onto the correlation matrix [X]. The encoding operation is defined in further detail herein under the section entitled Theory. Note that the hardware configuration presented, and the operational characteristics of a general purpose processor, requires that the above matrix transformation be performed in a sequential manner. The encoded element or elements of the correlation matrix [X] are stored back into memory storage unit 86 which is believed to perform an analogous function to the axo-dendritic synaptic connections.

Decoding (Embodiment in FIG. 15)

During a decoding operation the elements of the stimulus field ($s^*_j$) are read in either via the four serial input links 82 or via the external memory device 88 for memory mapped input. For the stimulus elements, a real and imaginary component derived from the phase and magnitude component of the complex element or vector ($s^*_j$) are read into the decoding unit 74. The real and imaginary components of the corresponding complex or vector element within the correlation matrix [X] are read from the external memory unit 86. The decoding unit 74 performs the decoding transformation as defined, in general by the following vector matrix transformation:

$$[R] = \frac{1}{c}[S]^* \cdot [X] \qquad \text{same as eq 19}$$

Note again that the hardware configuration presented and the operation of general purpose processors requires that the above matrix transformation be performed in a sequential manner. The decoding operation is defined in further detail herein under the heading entitled Theory.

The generated response [R] may be output either via the serial output links 80 or via the external memory device 90 for memory mapped output. Note again that the response output signal is represented by a real and imaginary component as illustrated in equation 53 above.

Other Functions (FIG. 15)

A third functional block defined within the processor block 78 is related to other functions or enhancements of the process. This functional block 78 has data access to both the serial input and output links 80 and 82 and the external memory 72. The embodiment of the ANS process within a general purpose processor provides a significant advantage in that a wide range of enhancements or variations of the basic process may be easily accommodated. A subset of possible enhancements consists of Hermittian or sigmoid preprocessing of the stimulus input field [S]* as described in the section pertaining to Enhancements of Invention, and all of the programmable functions listed under the heading Physical Embodiment of Device—Advanced Model (FIGS. 15 and 16).

Several of the processing nodes, as depicted in FIG. 15, may be connected together in any configuration to form an array of neural elements operating in an asycronous and parallel fashion. One possible parallel configuration is illustrated in FIG. 16 and consists of 16 processing nodes. Each processing node 92 consists of the hardware configuration presented in FIG. 15. The interconnection arrangement presented is generally referred to as a Boolean hypercube. In this arrangement each processing node accesses its own local memory and communicates with the four nearest nodes via high speed bidirectional serial communication.

In illustrating the likely computational capabilities of the above device employing the prescribed ANS process, a system (as presented in FIG. 16) is evaluated using operational specifications for existing and available components. The operational specifications for the constituent components are as follows:
local memory/node = 2 Megabytes
transmission rate/link = 20 Megabits/second
Processing speed/node = 20 Million Instructions/second Each processing node may be configured internally to represent several distinct and separate neural analogues. For this example it will be assumed that each neural analogue receives 8000 elements within its stimulus field (i.e. $[S] = [s_1, s_2 \ldots s_{8000}]$ and produces one response output. The information stored within each of the 8000 synaptic input analogues, are represented by a complex or vector element within the correlation matrix $[X]$. The memory requirements for each element of $[X]$ for this example is 4 bytes. A 16-bit resolution for the real and imaginary elements within the correlation matrix $[X]$ is assumed, accounting for the use of 4 bytes. The number of neural analogues that may be contained within each processing node ($N_u$) is therefore given by:

$$N_u = \frac{2 \times 10^6 \text{ bytes/node}}{4 \text{ bytes/synapse} \times 8000 \text{ synapse/neuron}}$$

$$= 64 \text{ neurons/node}$$

Memory Capacity (Embodiment in FIG. 16)

As discussed herein stimulus-response patterns may be superimposed onto the same memory medium. As the number of patterns increases, the average magnitude of the deterministic error within the decoded output response increases in a non-linear fashion. As discussed previously it is assumed that for a non-ideal distribution, such as that produced via the encoding of arbitrary visual patterns, permits a capacity for encoded stimulus-response patterns that may be reduced over the ideal random case. The storage capacity in this example is assumed to be N/4 where N is the number of elements within the stimulus field [S] (i.e. number of stimulus elements N=8000 and the capacity for encoded stimulus-response patterns approaches N/4 or 2000). It should be noted that for the ideal symetric distribution as produced on random data the pattern storage capacity may be larger. The above encoded set of stimulus-response patterns within a single neural analogue based on the assumptions outlined herein corresponds to the following information content ($\Omega$):

$$\Omega = 2000 \text{ patterns} \times 8000 \text{ elements/pattern}$$
$$= 16 \text{ Million elements (bytes)}$$

The above information content will be referred to as the virtual information storage capacity. Each processing node 90 contains 64 neuron analogues, therefore the virtual information capacity, being proportional to the number of neural elements, is given by:

$$= 16 \times 10^6 \text{ elements} \times 64 \text{ neurons/node}$$
$$= 1.0 \text{ Billion elements (bytes)/node}$$

For the described system comprising 16 nodes, the virtual information storage capacity corresponds to 16 Billion bytes.

Processing Speed (Embodiment in FIG. 16)

To provide an illustration of the effective processing capabilities for this embodiment, a comparative description is presented for the ANS process described herein in relation to conventional processing methodologies.

Within the domain of pattern identification and encompassing large sets of independent and nonlinear patterns, the technique of pattern matching is most widely applicable. A second analogous system may be state space analysis as defined within control theory, however, this method is practicably limited to smaller systems in which a group of patterns may be most easily defined in a linear functional relationship. The state space analogy is limited within its functional domain and therefore potentially not applicable.

The pattern matching technique involves a comparison of each element of the stimulus field against the corresponding element of each of the stored reference patterns. These patterns may represent any form of data either in non-compressed form or, if amenable, in a compressed form (i.e. converted to a frequency domain).

To illustrate the increase in computational efficiency, a conventional pattern matching technique will be described in general and compared operationally to the ANS process. Within pattern matching a pattern variance value could be generated for each reference pattern p as follows:

$$\sigma_p^2 = \frac{1}{N} \sum_{j=1}^{N} (a_j - b_{j,p})^2 \qquad \text{eq. 67}$$

where
$a_j$—element j of stimulus field
$b_{j,p}$—element j of stored pattern p

A set of pattern variance terms would be generated as follows:

$$(\sigma_1^2, \sigma_2^2, \sigma_3^2, \ldots \sigma_p^2)$$

and these values employed in some manner to determine or produce the output response.

For this illustration, in which the number of elements in the stimulus field for each neural analogue is 8000, the assumed number of patterns encoded is 2000. The pattern matching process requires that the following number of comparisons be performed:

8000 elements/pattern × 2000 patterns = 16 Million comparisons

Each comparison consists of evaluating the difference between an element in the input stimulus pattern and the corresponding element in a stored reference pattern and adjusting a correlation value (i.e. evaluation of a pattern variance or standard deviation value). The series of steps for a single comparison as described above will be referred to as virtual operation.

The ANS process described herein performs a roughly similar function, however, the operational characteristics are significantly more sophisticated and computationally efficient. As stated within the section pertaining to Theory, the output response is derived directly from the decoding transformation, and is a function of all of the encoded patterns as defined by:

$$r = \frac{1}{c} \sum_p \lambda e^{i\gamma p} \qquad \text{same as eq. 24}$$

where ($\lambda_1, \lambda_2, \lambda_3, \ldots \lambda_p$)    is the set of pattern correspondence values for patterns $p = 1$ to $P$ ($\gamma_1, \gamma_2, \gamma_3, \ldots \gamma_p$)    is the set of generated output response values for patterns $p = 1$ to $P$ Inherent to the above ANS process, the output response is issued directly as a vector quantity with phase angle representing the scalar response information and the magnitude statistically proportional to the degree of correspondence between stimulus and encoded patterns.

A single transformation as performed by the ANS decoding process is given by:

$$s_j^* \cdot x_j \text{ equivalent to } \sum_{p=1}^{2000} \{e^{i\xi j} e^{i(\Phi p - \theta j, p)}\} \qquad \text{eq. 68}$$

One may apply the conservatism that the above operation is similar to that performed by 2000 virtual operations within the conventional pattern matching process in determining or evaluating a response output.

A single transformation as described by equation 66, transforms one element within the stimulus field through the corresponding element for all of the encoded patterns (2000 in this example) superimposed in abstract form within matrix [X]. The number of mechanical steps therefore required is therefore reduced by the proportional amount (i.e. in this case reduced by a factor of 1/2000).

To illustrate the effective processing speed for the embodiment in FIG. 16 a simplifying assumption is made, in that the rate of encoding/decoding transformations is limited by the serial data link transmission rate for each processing node. Using the device characteristics as described above, the total transmission rate for 4 input links is:

20 Million bits/sec × 4 links = 80 Million bits/sec

To transmit one element of an input stimulus array [S] the number of required bits (8 bits comprise one byte) is given by:

8 (real component) + 8 (imaginary component) + 24 (destination code) = 40 bits or 5 bytes The above destination code is used to configure the synaptic interconnection arrangement. Several arrangements may be used to specify the synaptic interconnections and further description of a particular methodology is not pertinent to this general illustration.

To apply an additional level of conservation a second assumption is proposed such that, on average, only ½ of the transmission received are processed by the node to perform the decoding operation (issuance of a response), and the remaining ½ are either rerouted to alternate processing nodes, used for encoding, or used within miscellaneous support functions.

Applying the above two limiting assumptions (transformations limited by serial data transmission rate and ½ of transmissions are available), the number of transformations that may be performed within each processing node is given by:

$$\frac{80 \text{ Million bits/second}}{40 \text{ bits/transmissions}} \times 0.5 =$$

1 Million transformations/second

As noted previously, a single decoding operation (equation 19) simultaneously performs a virtual decoding operation on 2000 stimulus-response patterns. Each pattern represents one of 2000 stimulus-response patterns encoded into the abstract representation and superimposed onto correlation matrix [X]. For a comparative estimate, applying the virtual operation analogy as defined herein, the virtual processing speed for one processing node is given by:

$$1 \text{ Million } \frac{\text{transformations}}{\text{second}} \times 2000 \frac{\text{virtual operations}}{\text{transformation}} =$$

2.0 Billion virtual operations/second

It is believed that the processing speed for the described system consisting of 16 processing nodes in FIG. 16 could attain 32 Billion virtual operations/second.

The hardware embodiment described herein therefore yields a capacity to store 16 Billion virtual elements (bytes) of information in the form of encoded stimulus-response patterns, and process input sensory stimulus through the above accumulated information at a rate of 32 Billion virtual operations/second. It is expected that a system of this type, receiving stimulus from various forms of sensory modalities (i.e. vision, sound, touch), may potentially provide a suitable information processing substrate to facilitate and evoke the emergent characteristics of a form of intelligence such as that exhibited by the most primitive insect neurobiological system.

The described hardware embodiment is indicative of one possible example and may be expanded in any area including memory capacity, number of processing nodes, number of data links per node, rate of data link transmission, and processing rate per node. These increased capabilities may be used to construct devices emulating potentially higher levels of intelligence Although the preferred embodiment as well as the operation and use has been specifically described in relation to the drawings, it should be understood that variation in the preferred embodiments could easily be achieved by a skilled man in the trade without departing from the spirit of the invention. Accordingly, the invention should not be understood to be limited to the exact form revealed in the drawings.

The embodiments of the invention in which exclusive property or privilege is claimed are defined as follows:

1. In a plurality of computing nodes wherein each of said plurality communicates with others of said plurality by means of bidirectional serial communication means, and wherein each node comprises:
   (a) local memory storage means for storing data mapped onto said memory storage means;
   (b) micro-processing means including:
      (i) processor means;
      (ii) a plurality of data input means for receiving stimulus signals;
      (iii) a plurality of data output means for transmitting response signals;
      (iv) memory interface means for interfacing said micro-processing means with said local memory storage means;
   (c) said micro-processing means including:
      (i) means for encoding data onto said local memory storage means by translating sets of associated stimulus and response signals, received by said data input means from real values into a complex value represented by a vector phase angle and a magnitude exhibited within the generalized complex number domain and generating a matrix representing stimulus-response patterns for each set of associated stimulus and responses signals, whereby each said stimulus-response pattern is superimposed onto said local memory storage means;
      (ii) means operable for decoding a response, associated with a stimulus signal received by said data input means, from said matrix of stimulus-response patterns encoded on said local memory storage means, to generate a response signal associated with said stimulus signal through said data output means.

2. In a plurality of computing nodes as claimed in claim 1 wherein each said computing node is connected with four computing nodes by bidirectional serial communication means.

3. In a plurality of computing nodes as claimed in claim 1 which are connected so as to present a Boolean Hypercube configuration defined by the following structure:
   (a) each computing node labelled by a binary value;
   (b) the number of digits in the binary value indicate the number of communication paths to other computing nodes;
   (c) the total number of digits in the binary representation is expressed as an exponent to base 2 indicate the total number of computing nodes possible within the hypercube structure;
   (d) each computing node communicates to only the remote nodes labelled by a binary calue, whose logical result when forming an exclusive OR with the local computing nodes binary label produces a binary value having only one bit set.

4. In a plurality of computing nodes as claimed in claim 1 wherein said processing means includes means for sigmoid preprocessing of the stimulus input field of said matrix.

5. In a computing node as claimed in claim 1 wherein said processing means includes means for Hermitian preprocessing of the stimulus input field of said matrix, wherein an Hermitian matrix [H] represents the stimulus input set by a linear (1 by N) matrix [S] and forms the matrix product of [S] with its conjugate transpose:

$$[H] = [S]^*[S]^T$$

wherein the stimulus field is expanded to $N^2$ terms to thereby permit a proportionately larger number of stimulus to response mappings to be enfolded onto the identically same mapping substrate, while maintaining statistically similar analog error values on response recall.

* * * * *